US011784999B1

(12) United States Patent
Jones et al.

(10) Patent No.: US 11,784,999 B1
(45) Date of Patent: *Oct. 10, 2023

(54) CREDENTIAL MANAGEMENT FOR DISTRIBUTED SERVICES

(71) Applicant: strongDM, Inc., New York, NY (US)

(72) Inventors: William Craig Jones, Cedar Park, TX (US); Justin Allan McCarthy, Redwood City, CA (US); Patrick David Stephen, Minneapolis, MN (US); Evan Michael Todd, Culver City, CA (US)

(73) Assignee: strongDM, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,895

(22) Filed: Dec. 30, 2022

Related U.S. Application Data

(63) Continuation of application No. 17/889,788, filed on Aug. 17, 2022, now Pat. No. 11,546,323.

(51) Int. Cl.
*H04L 9/40* (2022.01)

(52) U.S. Cl.
CPC .................. *H04L 63/083* (2013.01)

(58) Field of Classification Search
CPC .................................... H04L 63/083
See application file for complete search history.

(56) References Cited

U.S. PATENT DOCUMENTS

| | | |
|---|---|---|
| 7,233,569 B1 | 6/2007 | Swallow |
| 7,752,466 B2 | 7/2010 | Ginter et al. |
| 7,886,339 B2 * | 2/2011 | Keohane ............. H04L 63/0876 709/227 |
| 8,102,814 B2 | 1/2012 | Rahman et al. |
| 8,135,815 B2 | 3/2012 | Mayer |
| 9,082,402 B2 | 7/2015 | Yadgar et al. |
| 9,178,793 B1 | 11/2015 | Marlow |
| 9,239,834 B2 | 1/2016 | Donabedian et al. |

(Continued)

OTHER PUBLICATIONS

Office Communication for U.S. Appl. No. 17/733,735 dated Jul. 12, 2022, pp. 1-38.

(Continued)

*Primary Examiner* — Aravind K Moorthy
(74) *Attorney, Agent, or Firm* — John W. Branch; Branch Partners PLLC

(57) ABSTRACT

Embodiments are directed to credential management for distributed services. A plurality of mesh agents for an overlay network may be provided such that the overlay network may be employed to provide a secure tunnel between a client and a resource server. If client request that requires user credentials is provided to a mesh agent associated with the resource server, credential instructions may be provided to the mesh agent and the credential instructions may be employed to determine credential information that enables access to the resource server. The mesh agent may be employed to communicate the client request and the credential information to the resource server; determining a response to the client request from the resource server; employing the mesh agent to receive a response to the client request from the resource server and forwarded to the client over the overlay network.

20 Claims, 15 Drawing Sheets

(56) References Cited

U.S. PATENT DOCUMENTS

| | | |
|---|---|---|
| 9,300,635 B1 | 3/2016 | Gilde et al. |
| 9,632,828 B1 | 4/2017 | Mehta et al. |
| 9,800,517 B1 | 10/2017 | Anderson |
| 10,075,334 B1* | 9/2018 | Kozura ............... H04W 12/086 |
| 10,110,593 B2* | 10/2018 | Karroumi ........... H04L 63/0823 |
| 10,117,098 B1* | 10/2018 | Naguthanawala ...... H04L 63/18 |
| 10,292,033 B2* | 5/2019 | Beyer, Jr ............ H04L 63/065 |
| 10,645,562 B2* | 5/2020 | Beyer, Jr. .......... H04M 1/72418 |
| 10,735,263 B1 | 8/2020 | McAlary ............ H04L 45/028 |
| 11,075,747 B1* | 7/2021 | Holsman ............ H04L 63/0442 |
| 11,102,147 B2 | 8/2021 | Mehta et al. |
| 11,290,143 B1 | 3/2022 | Sternowski |
| 11,316,822 B1 | 4/2022 | Gawade et al. |
| 11,323,919 B1 | 5/2022 | Parulkar et al. |
| 11,375,300 B2 | 6/2022 | Sagie et al. |
| 11,412,051 B1 | 8/2022 | Chiganmi et al. |
| 11,431,497 B1* | 8/2022 | Liguori ................ H04L 9/0897 |
| 11,521,444 B1* | 12/2022 | Badik ................ G07C 9/00571 |
| 11,528,147 B2 | 12/2022 | Madisetti et al. |
| 11,546,323 B1* | 1/2023 | Jones .................. H04L 63/083 |
| 11,546,763 B1 | 1/2023 | Cirello Filho et al. |
| 11,599,714 B2 | 3/2023 | Munro et al. |
| 11,599,841 B2 | 3/2023 | Anisingaraju et al. |
| 11,620,103 B2 | 4/2023 | Graham et al. |
| 2005/0164650 A1 | 7/2005 | Johnson |
| 2005/0209876 A1 | 9/2005 | Kennis et al. |
| 2006/0190991 A1* | 8/2006 | Iyer ..................... H04L 63/083 |
| | | 726/3 |
| 2006/0212487 A1 | 9/2006 | Kennis et al. |
| 2006/0240824 A1* | 10/2006 | Henderson ............ H04L 51/04 |
| | | 455/411 |
| 2006/0288204 A1* | 12/2006 | Sood ................... H04L 63/083 |
| | | 713/181 |
| 2007/0009104 A1 | 1/2007 | Renkis |
| 2009/0037607 A1 | 2/2009 | Farinacci et al. |
| 2009/0164663 A1 | 6/2009 | Ransom et al. |
| 2009/0222559 A1 | 9/2009 | Anipko et al. |
| 2011/0225311 A1 | 9/2011 | Liu et al. |
| 2012/0304265 A1* | 11/2012 | Richter ................ H04L 63/102 |
| | | 715/234 |
| 2013/0173794 A1* | 7/2013 | Agerbak ............... H04W 48/18 |
| | | 709/225 |
| 2013/0198558 A1 | 8/2013 | Rao et al. |
| 2013/0268260 A1 | 10/2013 | Lundberg et al. |
| 2014/0044265 A1* | 2/2014 | Kocher ................. G06F 21/71 |
| | | 380/277 |
| 2014/0057676 A1* | 2/2014 | Lord ................... H04B 10/1141 |
| | | 455/556.1 |
| 2014/0136970 A1 | 5/2014 | Xiao |
| 2015/0127949 A1* | 5/2015 | Patil ..................... H04L 63/065 |
| | | 713/168 |
| 2015/0135300 A1* | 5/2015 | Ford ..................... G06Q 50/18 |
| | | 726/11 |
| 2015/0208273 A1 | 7/2015 | Raleigh et al. |
| 2015/0281952 A1* | 10/2015 | Patil ..................... H04W 12/50 |
| | | 713/168 |
| 2015/0382198 A1* | 12/2015 | Kashef ................ H04L 67/303 |
| | | 726/5 |
| 2016/0014669 A1 | 1/2016 | Patil et al. |
| 2016/0014818 A1 | 1/2016 | Reitsma et al. |
| 2016/0080128 A1* | 3/2016 | Hebron ................ H04L 9/0844 |
| | | 370/328 |
| 2016/0173501 A1* | 6/2016 | Brown ................ H04L 63/102 |
| | | 726/4 |
| 2016/0180102 A1* | 6/2016 | Kim ................... G06F 12/1408 |
| | | 713/164 |
| 2016/0262021 A1* | 9/2016 | Lee ..................... H04W 12/06 |
| 2016/0294826 A1* | 10/2016 | Han .................... H04W 12/086 |
| 2016/0314355 A1* | 10/2016 | Laska .................. G06F 3/048 |
| 2017/0061956 A1 | 3/2017 | Sarikaya et al. |
| 2017/0103440 A1* | 4/2017 | Xing .................... H04W 12/06 |
| 2017/0111368 A1* | 4/2017 | Hibbert ............... H04L 63/062 |
| 2017/0126734 A1 | 5/2017 | Harney |
| 2017/0142810 A1* | 5/2017 | Cho ..................... H04W 4/70 |
| 2017/0279971 A1 | 9/2017 | Raleigh et al. |
| 2017/0339561 A1* | 11/2017 | Wennemyr ............ H04W 64/00 |
| 2017/0364505 A1 | 12/2017 | Sarikaya et al. |
| 2017/0372087 A1* | 12/2017 | Lee ..................... H04L 9/0863 |
| 2018/0061158 A1 | 3/2018 | Greene |
| 2018/0123957 A1 | 5/2018 | Chen et al. |
| 2018/0167373 A1* | 6/2018 | Anderson ............. H04W 4/80 |
| 2018/0233141 A1 | 8/2018 | Solomon et al. |
| 2018/0288026 A1* | 10/2018 | Callaghan ............ H04L 9/3226 |
| 2018/0359369 A1* | 12/2018 | Golshenas ............ H04W 4/14 |
| 2018/0367308 A1* | 12/2018 | Kacin ................. H04L 9/0869 |
| 2019/0039569 A1 | 2/2019 | Reed et al. |
| 2019/0073373 A1* | 3/2019 | Surale .................. H04L 63/083 |
| 2019/0075095 A1* | 3/2019 | Venable .............. H04L 63/1433 |
| 2019/0104411 A1* | 4/2019 | Hotchkiss ............ H04W 12/08 |
| 2019/0116132 A1 | 4/2019 | Suzuki |
| 2019/0124507 A1* | 4/2019 | Dotchkoff ............. H04L 67/12 |
| 2019/0147154 A1* | 5/2019 | Das .................... G06Q 30/0185 |
| | | 726/21 |
| 2019/0349758 A1* | 11/2019 | Zhu ..................... H04W 12/65 |
| 2020/0007540 A1* | 1/2020 | Kawaguchi .......... H04B 1/0458 |
| 2020/0219023 A1 | 7/2020 | Duchastel |
| 2020/0220848 A1 | 7/2020 | Patwardhan |
| 2020/0257179 A1* | 8/2020 | Barnum ............. G06F 16/24568 |
| 2020/0267552 A1* | 8/2020 | Lee ..................... H04W 12/068 |
| 2020/0272911 A1 | 8/2020 | Quiros Araya et al. |
| 2020/0296779 A1* | 9/2020 | Moghe .................. H04B 3/544 |
| 2020/0322286 A1 | 10/2020 | Mehta et al. |
| 2020/0323030 A1 | 10/2020 | Mehta et al. |
| 2020/0382488 A1* | 12/2020 | Liu ..................... H04L 63/0807 |
| 2021/0056524 A1* | 2/2021 | Isgar .................. G06Q 30/0185 |
| 2021/0056536 A1 | 2/2021 | Carter et al. |
| 2021/0091941 A1* | 3/2021 | Pancras ................ H04L 9/0863 |
| 2021/0168661 A1 | 6/2021 | Wong et al. |
| 2021/0211423 A1* | 7/2021 | Tan ..................... H04W 12/71 |
| 2021/0223128 A1* | 7/2021 | Kirch ................... G01L 19/086 |
| 2021/0224091 A1* | 7/2021 | Hayatnagarkar ..... G06F 16/955 |
| 2021/0226910 A1 | 7/2021 | Ranpise et al. |
| 2021/0281572 A1* | 9/2021 | Fernandez-Spadaro ..................... |
| | | H04L 63/083 |
| 2021/0294970 A1 | 9/2021 | Bender et al. |
| 2021/0306310 A1* | 9/2021 | Tan ..................... H04L 63/083 |
| 2021/0312400 A1* | 10/2021 | Irimie ................. H04L 63/1433 |
| 2021/0314399 A1 | 10/2021 | Hyun et al. |
| 2021/0344492 A1 | 11/2021 | Goodsitt et al. |
| 2021/0406902 A1* | 12/2021 | Bernert ................ G06Q 20/204 |
| 2022/0007437 A1* | 1/2022 | Goenka ................ H04L 67/141 |
| 2022/0038544 A1* | 2/2022 | Grinstein ............. H04L 63/0853 |
| 2022/0052850 A1* | 2/2022 | Fagan ................. H04L 65/1104 |
| 2022/0086639 A1* | 3/2022 | Lu ....................... H04B 10/516 |
| 2022/0150312 A1 | 5/2022 | Ranpise et al. |
| 2022/0159029 A1* | 5/2022 | Bendersky .......... H04L 63/1433 |
| 2022/0217084 A1 | 7/2022 | Arora et al. |
| 2022/0263913 A1 | 8/2022 | Zhang et al. |
| 2022/0294540 A1* | 9/2022 | Black ................... H04W 12/50 |
| 2022/0311767 A1* | 9/2022 | Ouellet ................. H04L 9/0822 |
| 2022/0329477 A1 | 10/2022 | Chiganmi et al. |
| 2022/0334864 A1 | 10/2022 | K N et al. |
| 2023/0007439 A1* | 1/2023 | Williams ............ G06Q 10/0635 |
| 2023/0027507 A1* | 1/2023 | He ....................... H04L 63/083 |
| 2023/0032790 A1* | 2/2023 | Mahajan ............... H04L 63/083 |
| 2023/0059173 A1* | 2/2023 | Moon .................. H04L 63/0435 |
| 2023/0067223 A1* | 3/2023 | Freed .................. H04L 63/0281 |
| 2023/0153447 A1 | 5/2023 | Kapadia |

OTHER PUBLICATIONS

Office Communication for U.S. Appl. No. 17/733,735 dated Nov. 1, 2022, pp. 1-7.

Office Communication for U.S. Appl. No. 17/889,788 dated Nov. 7, 2022, pp. 1-12.

Office Communication for U.S. Appl. No. 17/954,697 dated Jan. 20, 2023, pp. 1-13.

Office Communication for U.S. Appl. No. 18/094,858 dated Mar. 16, 2023, pp. 1-10.

Office Communication for U.S. Appl. No. 18/091,006 dated Mar. 31, 2023, pp. 1-12.

(56) References Cited

OTHER PUBLICATIONS

Office Communication for U.S. Appl. No. 17/900,121 dated Apr. 4, 2023, pp. 1-13.
Office Communication for U.S. Appl. No. 18/091,006 dated Apr. 19, 2023, pp. 1-9.
Office Communication for U.S. Appl. No. 17/954,697 dated May 12, 2023, pp. 1-5.
Office Communication for U.S. Appl. No. 18/131,151 dated Jun. 8, 2023, pp. 1-9.

\* cited by examiner

CREDENTIAL MANAGEMENT FOR DISTRIBUTED SERVICES

CROSS-REFERENCE TO RELATED APPLICATIONS

This Utility Patent Application is a Continuation of U.S. patent application Ser. No. 17/889,788 filed on Aug. 17, 2022, now U.S. Pat. No. 11,546,323 issued on Jan. 3, 2023, the benefit which is hereby claimed under 35 U.S.C. § 120 and the contents of which is further incorporated in entirety by reference.

TECHNICAL FIELD

The present invention relates generally to network security, and more particularly, but not exclusively, to credential management for distributed services.

BACKGROUND

As organizations become increasingly dependent on networked environments, remote services, distributed services, or the like, managing and monitoring infrastructure access in networked environments can become both critically important and more difficult. Difficulties in managing network environments may not be new, however, interconnections among remote offices, data centers, remote employees, remote customers, and so on, have resulted in organizations relying more broadly on heterogeneous distributed networked services, or the like. Also, in some cases, regulatory environment has been adapting to the increase in computer-based services. Accordingly, organizations may be required to comply with regulatory regimes from multiple jurisdictions related to various critical subjects, such as, finance, privacy, employee rights, cross jurisdiction taxation, and so on. The combination of the increase in reliance on distributed and networked services and ongoing changes in regulatory environments has tended to elevate the importance of managing and monitoring infrastructure access in networked environments both for operations as well as compliance with various regulatory regimes. Credential management is an important feature of infrastructure security. In some cases, it may be difficult to provide centralized management of technology infrastructure without enabling centralized access to the services providing infrastructure security management. In some cases, enabling infrastructure security services to directly access or maintain credential information may increase the security risk associated with such services. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
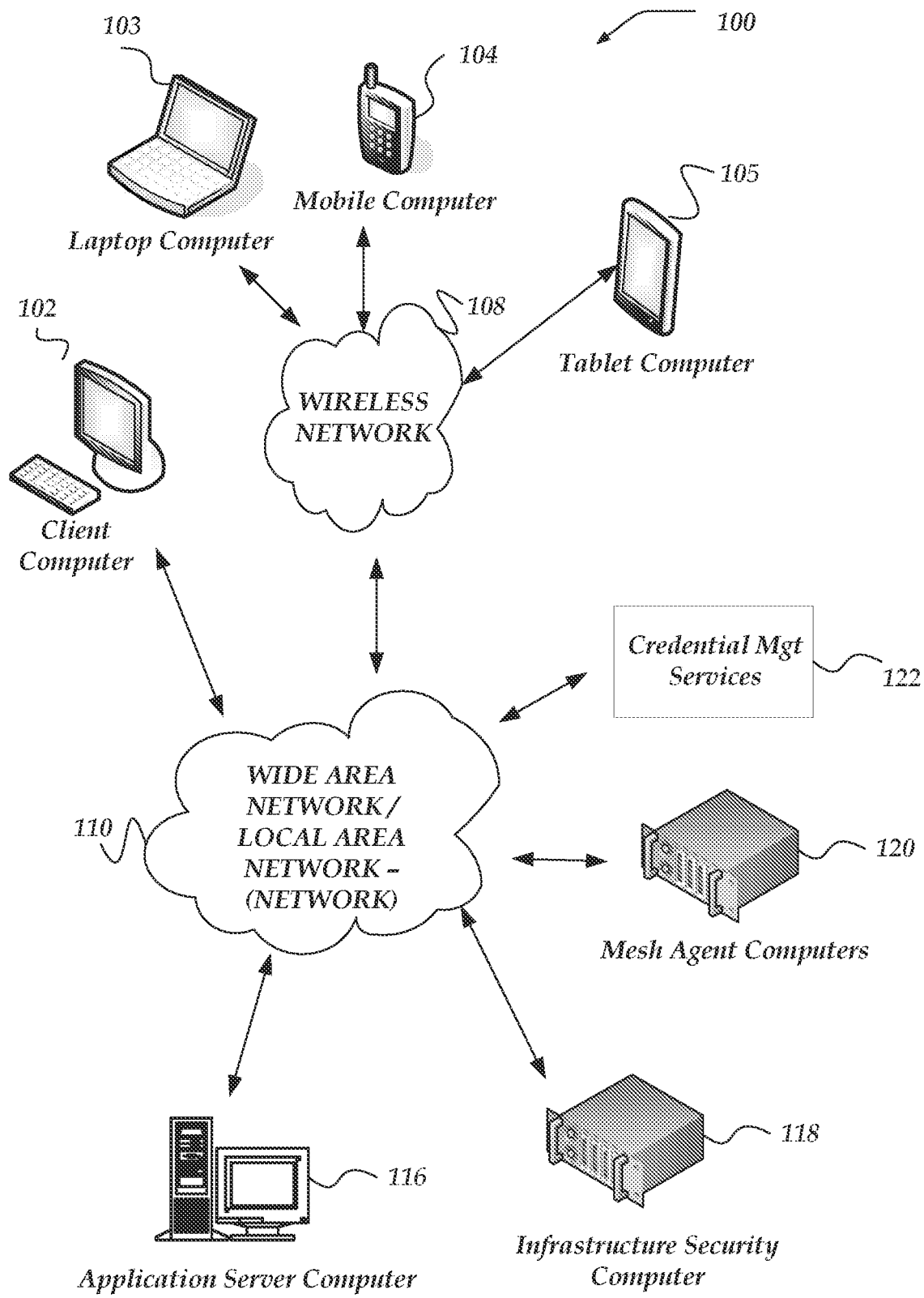
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, R, Julia, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "session" refers to a semi-permanent interactive packet interchange between two or more communicating endpoints in a networked environment. A session is set up or established at a certain point in time, and torn down at a later point in time. An established communication session may involve more than one message in each direction. A session may have stateful communication where at least one of the communicating endpoints saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the terms "network connection," and "connection" refer to communication sessions with a semi-permanent connection for interactive packet interchange between two or more communicating endpoints, such as network devices. The connection may be established before application data is transferred, and where a stream of data is delivered in the same or different order than it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths. Packets associated with a TCP protocol connection may also be routed independently and could be delivered over different paths. However, for TCP connections the network communication system may provide the packets to application endpoints in the correct order.

As used herein, the term "tuple" refers to a set of values that identify a source and destination of a network communication or network traffic packet, which may, under some circumstances, be a part of a network connection. In one embodiment, a tuple may include a source Internet Protocol (IP) address, a destination IP address, a source port number, a destination port number, virtual LAN segment identifier (VLAN ID), tunnel identifier, routing interface identifier, physical interface identifier, or a protocol identifier. Tuples may be used to identify network flows (e.g., connection flows).

As used herein, the term, "protocol" refers generally to network protocols that may be employed in a network, including data-link layer protocols, transport layer protocols, application layer protocols, or the like. Thus, unless otherwise indicated, innovations described as working with or being associated with a protocol may be applicable to protocols of various OSI layers, or the like, or combination thereof.

As used herein, the term, "application protocol" refers generally to communication protocols that may be employed in a network that enable one or more applications or services and their client applications to communicate in a networked environment. Application protocols may be considered distinct from transport protocols that may be used to ferry application protocol traffic in networks or among processes/services.

As used herein, the term "mesh agent" refers to programs, process, or services that provide a node, link, or hop in a software defined network. Multiple mesh agents may provide secure tunnels between each other to provide a secure overlay network that may be provided in a conventional underlay network. In some cases, one or more mesh agents may be hosted on network computers in a networked environment.

As used herein, the term "ingress agent" refers to a mesh agent that a client application or user gains access to an overlay network. Ingress agents may be considered mesh agents that are on a logical edge of an overlay network. For example, if a client application requires access to an overlay network to access a protected resource, the first mesh agent that the client application communicates to join or access the overlay network may be considered an ingress agent.

As used herein, the term "egress agent" refers to a mesh agent that may directly communicate with a protected resource. Egress agents may be considered mesh agents that are on a logical edge of an overlay network. For example, client requests provided by a client to an ingress agent may be forwarded through one or more mesh agents in an overlay network until they reach an egress agent associated with the target resource.

As used herein, the term "credential vault" refers to services or systems organizations may employ to manage credential secrets that may be used to access various resources in protected networks. Credential vaults may include user directories, LDAP servers, file systems, password managers, configuration databases, or the like. Credential vaults may provide one or more schemes or interfaces that enable programmatic access to the credential secrets stored in a credential vault.

As used herein, the term "credential instruction" refers data or data structures that may be interpreted to determine one or more locations, actions, options, or the like, for obtaining credential secrets from one or more credential vaults. Credential instructions may include enough information to obtain credential secrets without including secret information. Thus, if credential instructions are compromised by malicious actors, credential secrets may remain uncompromised.

As used herein, the term "credential information" refers to data or data structures that include credential secrets that enable access to protected resource servers. For example, credential information may include usernames, passwords, pass-phrases, security certificates, or the like.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to credential management for distributed services. In one or more of the various embodiments, a plurality of mesh agents for an overlay network may be provided such that each mesh agent may be hosted on one or more network computers in the overlay network and such that the overlay network may be employed to provide a secure tunnel between a client and a resource server.

In one or more of the various embodiments, in response to a client request that requires user credentials being provided to a mesh agent associated with the resource server, further actions may be performed, including: providing credential instructions to the mesh agent based on the client request such that the credential instructions may be employed to determine credential information that enables access to the resource server; employing the mesh agent to communicate the client request and the credential information to the resource server; determining a response to the client request from the resource server; employing the mesh agent to receive a response to the client request from the resource server such that the response may be forwarded to the client over the overlay network; or the like.

In one or more of the various embodiments, determining the credential information includes: determining one or more of a grammar or a ruleset based on the credential instructions and the client request; employing the one or more of the grammar or the ruleset to interpret the credential instructions; determining one or more actions for acquiring access to the credential information based on the interpretation of the credential instructions; executing the one or more actions to determine the credential information; or the like.

In one or more of the various embodiments, determining the credential information, includes: determining one or more credential vaults based on the credential instructions such that one or more portions of the credential information may be stored in the one or more credential vaults; determining one or more actions that enable access to the one or more credential vaults based on the credential instructions; executing the one or more actions to obtain the credential information from the one or more credential vaults; or the like.

In one or more of the various embodiments, communicating the client request and the credential information from the mesh agent to the resource server, includes: determining one or more portions of the client request that may be associated with passing one or more credential secrets to the resource server based on an application protocol; modifying the client request to include one or more portions of the credential information based on the one or more portions of the client request that may be associated with passing the one or more credential secrets to the resource server based on the application protocol; further modifying the client request based on the included one or more portions of the credential information such that the further modifications to the client request include one or more of an updated checksum, an updated hash digest value, or an updated message size value; providing the modified client request to the resource server; or the like.

In one or more of the various embodiments, the client request may be provided to a mesh agent associated with the client application. In some embodiments, an application protocol associated with the client request may be determined based on one or more of the client request, the client application, or the resource server. In one or more of the various embodiments, one or more portions of the client request that may be associated with passing one or more credential secrets to the resource server may be determined based on the application protocol. In some embodiments, the client request may be modified to include one or more placeholder secrets based on the one or more portions of the client request that may be associated with passing the one or more credential secrets to the resource server based on the application protocol. In some embodiments, the client request may be further modified based on the included one or more placeholder secrets such that the further modifications to the client request include one or more of an updated checksum, an updated hash digest value, or an updated message size value. In some embodiments, the modified client request m may be communicated to the overlay network for delivery to the resource server.

In one or more of the various embodiments, the actions performed in response to the client request may include: providing a request to an infrastructure security computer (ISC) in the overlay network to authorize the client request; in response to the ISC rejecting the authorization request, rejecting the client request and disabling the mesh agent from communicating the client request and the credential information to the resource server; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, application server computer 116, infrastructure security computer 118, one or more mesh agent computers 120, credential management services 122, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, infrastructure security computer 118, mesh agent computers 120, credential management services 122, or other computers.

Client computers 102-105 may further be configured to include a client application that enables an end-user to log into an end-user account that may be managed by another computer, such as application server computer 116, infrastructure security computer 118, mesh agent computers 120, credential management services 122, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to infrastructure security computer 118. Also, client computers may be arranged to enable users to display reports, interactive user-interfaces, results provided by infrastructure security computer 118, mesh agent computers 120, credential management services 122, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, infrastructure security computer 118, mesh agent computers 120, credential management services 122, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, infrastructure security computer 118, and mesh agent computers 120 are described in more detail below in conjunction with FIG. 3. Although FIG. 1 illustrates application server computer 116, infrastructure security computer 118, and mesh agent computers 120 each as a single computer, the innovations or embodiments are not so limited. For example, one or more functions of application server computer 116, infrastructure security computer 118, and mesh agent computers 120, or the like, may be distributed across one or more distinct network computers. Moreover, in one or more embodiments, infrastructure security computer 118 may be implemented using a plurality of network computers. Further, in one or more of the various embodiments, application server computer 116, infrastructure security computer 118, or mesh agents 120 may be implemented using one or more cloud instances in one or more cloud networks. Accordingly, these innovations and embodiments are not to be construed as being limited to a single environment, and other configurations, and other architectures are also envisaged.

Also, in one or more of the various embodiments, various applications or application servers in computing environment may be configured to employ one or more credential management services represent by credential management services 122. In some embodiments, credential management services may provide one or more API or interfaces that enable other authorized services to obtain credential information that enables users or other services to access one or more protected applications. In general, credential management services provide organizations centralized management of credential that enable users or services to access various resources in an organizations computing infrastructure. In some cases, credential management services may be provided by third-party/external service providers. Also, in some cases, credential management services may be applications/services hosted locally or otherwise within an organizations protected networking environment. In some cases, organizations may employ more than one credential management service.

Illustrative Client Computer

Figure 2:
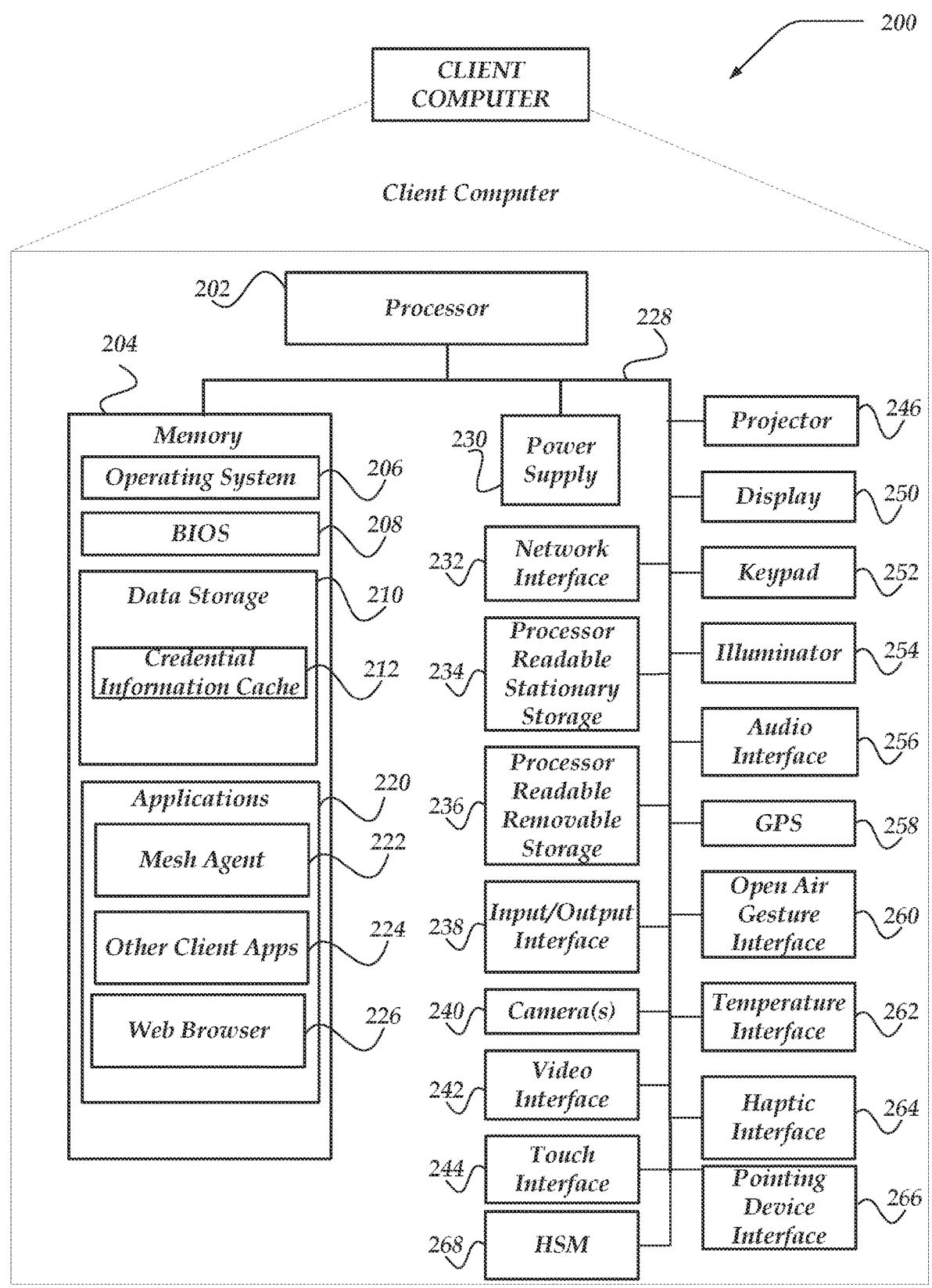
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer. Further, in some embodiments, data storage 210 may include credential information cache 212 for temporary storage of credential information.

Applications 220 may include computer executable instructions which, when executed by client computer 200, transmit, receive, or otherwise process instructions and data. Applications 220 may include, for example, mesh agent 222, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
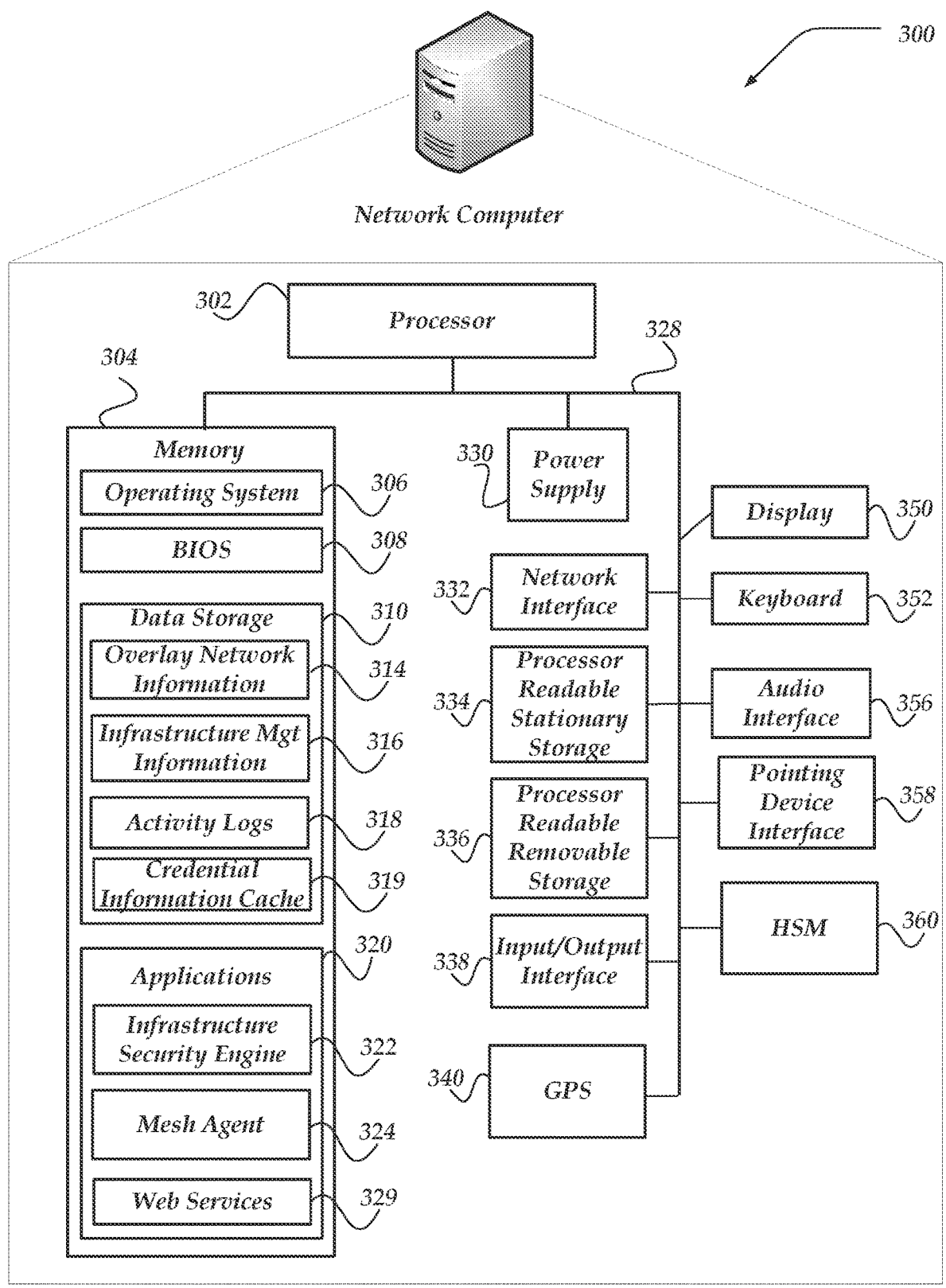
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, infrastructure security computer 118, or mesh agent computers 120 FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the client computer, including for example, a Media Access Control (MAC) address, IP address, and the like.

In at least one of the various embodiments, applications, such as, operating system 306, overlay network engine 322, mesh agent 324, web services 329, or the like, may be arranged to employ geo-location information to select one or more localization features, such as, time zones, languages, currencies, calendar formatting, or the like. Also, localization features may be used when interpreting network traffic, application protocols, modifying/localizing client requests, modifying/localizing server responses, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geo-location protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data.

For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 314, infrastructure management information 316, activity logs 318, credential information cache 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network engine 322, mesh agent 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, overlay network engine 322, mesh agent 324, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to overlay network engine 322, mesh agent 324, web services 329, or the like, may be provisioned and de-commissioned automatically.

Also, in one or more of the various embodiments, overlay network engine 322, mesh agent 324, web services 329, or the like, may be located in virtual servers running in a cloud-based computing environment rather than being tied to one or more specific physical network computers. Likewise, in some embodiments, one or more of overlay network engine 322, mesh agent 324, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
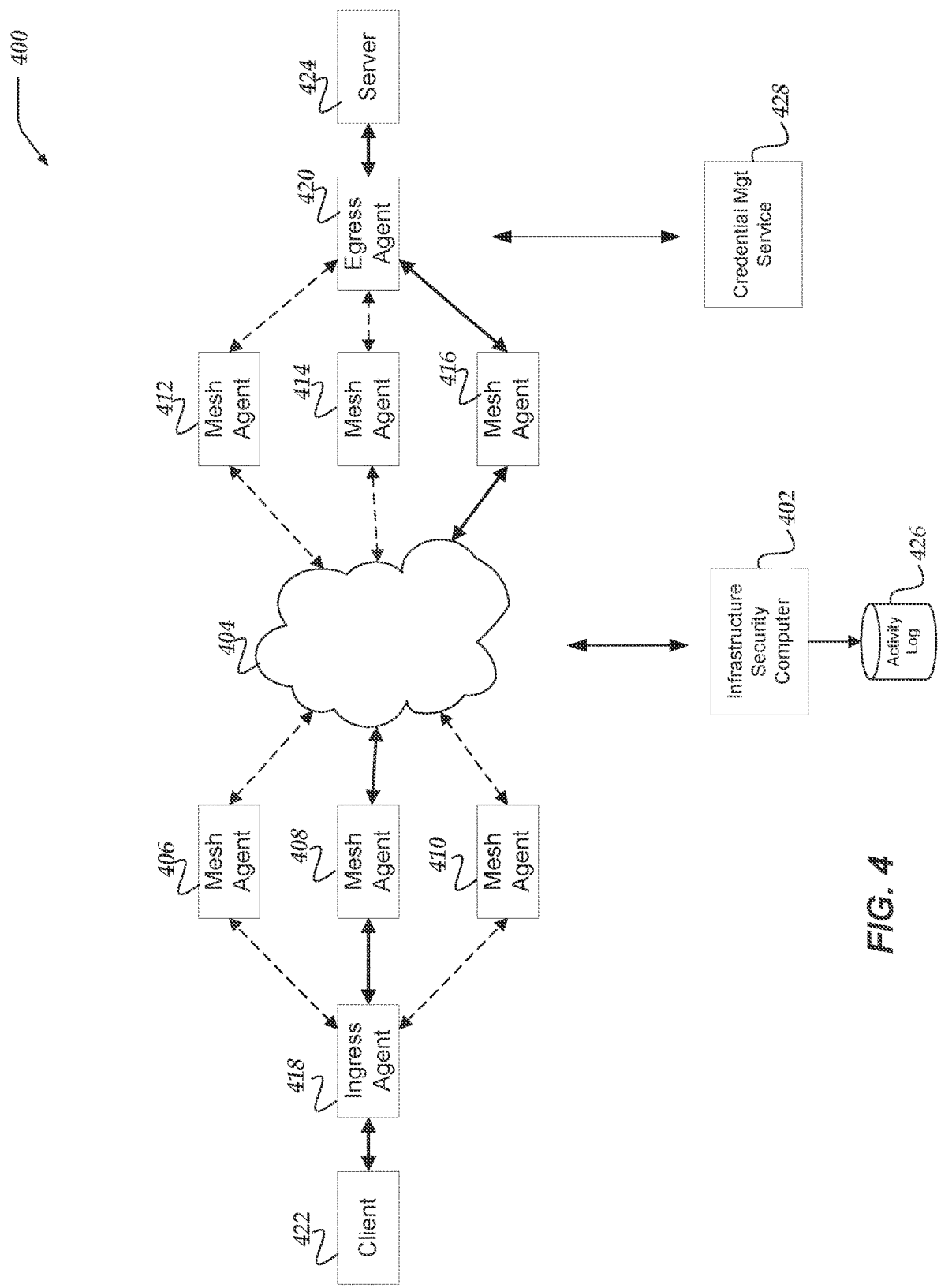
FIG. 4 illustrates a logical architecture of a system for credential management for distributed services in accordance with one or more of the various embodiments.

FIG. 4 illustrates a logical architecture of system 400 for credential management for distributed services in accordance with one or more of the various embodiments. In some embodiments, system 400 may comprise: one or more infrastructure security computers, such as, infrastructure security computer 402; one or more networks, such as, network 404; one or more mesh agents, such as, mesh agents 406-410 or mesh agents 412-416; one or more edge agents, such as, ingress agent 418 or egress agent 420; one or more clients, such as, client 422 or client 424; one or more activity log data stores, such as, activity log 426; one or more credential management services, such as, credential management service 428, or the like.

Note, one or more portions of system 400 illustrates a non-limiting example of a software defined network system or overlay network system. One of ordinary skill in the art will appreciate that other mesh network architectures or overlay network management schemes may be employed without departing from the scope of the innovations disclosed herein. However, the description of system 400 is sufficient for enabling one of ordinary skill in the art to understand the innovations disclosed herein.

In one or more of the various embodiments, mesh agents may be arranged to provide a software-defined overlay network that runs on one or more conventionally configured/ provisioned physical (underlay) networks. In some embodiments, if a client application attempts to access resources managed by an infrastructure security service, the mesh agent used by clients to gain access to resources in a managed environment may be considered an ingress agents. Similarly, mesh agents that enable resource servers to respond to client request via the overlay network may be considered to be egress agents. Accordingly, in some cases mesh agents may be considered to be ingress agents in some contexts and they may be considered to be egress agents in other contexts. The different nomenclature is used herein as a convenience to describe features of embodiments in the different contexts.

In one or more of the various embodiments, infrastructure security computers, such as, infrastructure security computer 402, may host one or more infrastructure security engines that enforce a secure overlay network that provides managed access to one or more resources (or endpoints) in an networked environment.

In one or more of the various embodiments, if a client employs an mesh agent, such as, ingress agent 418, the ingress agent may be arranged communicate with infrastructure security computer 402 to authenticate the client request and determine a network path from the client to the target resource server via the overlay network.

In one or more of the various embodiments, mesh agents may be arranged to determine a next 'hop' to a next mesh agent. Accordingly, the next mesh agent, as well as, other mesh agents, may determine the next hop to a next mesh agent. Eventually, in some embodiments, the communication or request may reach an egress agent for the target resource server. And, in some embodiments, if each intervening mesh agent validates or authenticates the client communication, the client communication may reach the intended target resource server.

In one or more of the various embodiments, if an ingress agent receives a client request, the ingress agent may send a communication to an infrastructure security computer, such as, infrastructure security computer 402 to determine one or more authorized routes through the overlay network to reach the target resource server. In some embodiments, routes through the overlay network may be considered to be overlay paths that go from mesh agent-to-mesh agent until the target server may be reached.

In one or more of the various embodiments, mesh agents may establish a cryptographically secure virtual network tunnel between clients and servers such that the client/server traffic may be opaque to observers or other network devices that may be unaffiliated with the infrastructure security computer.

Note, one of ordinary skill in the art will appreciate that system 400 may comprise one or more network devices, network computers, routers, switches, or the like, that comprise the underlay network. For brevity and clarity, the underlay network components are omitted from FIG. 4.

In one or more of the various embodiments, mesh agents may be considered to be hosted on physical or virtual computers that have access to the underlay networks. Also, in some embodiments, the number of overlay network hops (between/via mesh agents) between endpoints may be different than the actual network hops required by the underlay network. For example, for some embodiments, system 400 shows one overlay hop to get from ingress agent 418 to mesh agent 408. However, in some cases, there may be multiple hops in the underlay network (not shown) to exchange network traffic between ingress agent 418 and mesh agent 408. For example, in some embodiments, one hop in the overlay network may traverse one or more sub-networks that may require multiple hops through multiple underlay network routers.

In one or more of the various embodiments, if a client provides a request to communicate with a managed endpoint (e.g., resource server 424), the corresponding ingress agent (e.g., ingress agent 418) forwards information about the request to an infrastructure security computer (e.g., infrastructure security computer 402). Accordingly, in some embodiments, an infrastructure security engine (hosted on the infrastructure security computer) may be arranged to determine if the client user has permission to communicate with the target endpoint. Also, in some embodiments, the infrastructure security engine may be arranged to determine one or more next mesh agents where the ingress agent may forward the client request. Accordingly, in some embodiments, infrastructure security engines may be arranged to generate an overlay route table that includes one or more available mesh agents that may be candidates that may be suitable and authorized for handling the communication.

In some embodiments, as client the communication may be forwarded to subsequent mesh agents, each intervening mesh agent may be arranged to validate and authenticate the client communication using the infrastructure security engine. In some embodiments, if the client communication may be authorized, the infrastructure security engine may provide an overlay route table that identifies one or more mesh agents for the next hop through the overlay network.

In this example, the overlay path determined for client 422 to communicate with server 424 is ingress client 418 to mesh agent 408 to mesh agent 416 to egress agent 420 and ultimately to server 424. At the final mesh agent (e.g., egress agent 420), the egress agent may determine/obtain the credentials that enable access to the server. In some embodiments, egress agents may be arranged to communicate with an infrastructure security computer to obtain credentials for a server. In this example, the connections (double-arrow lines) illustrated with solid lines represent the determined route through the overlay network. In contrast, the connections (double-arrow lines) illustrated using dashed lines represent mesh agents that may be part of the overlay network that were not selected for a particular communication between client 422 and server 424.

In one or more of the various embodiments, ingress agents, egress agents, or mesh agents may be configured to capture or record activity that may associated with the communication through the secure tunnel. In this example, for some embodiments, activity log data store 426 represents a data store for storing logged or recorded activity for a managed infrastructure. In some embodiments, infrastructure security engines may be arranged to enable different types of activity logging. In some embodiments, infrastructure security engines may be configured to record one or more of the user information associated with an action, occurrence of actions, the accompanying application payload (if any), response from servers, or the like. Further, in some embodiments, infrastructure security engines may enable log information to be forwarded to another data store for storage or archival.

In one or more of the various embodiments, infrastructure security engines may be arranged to generate authenticity tokens that may act as a fingerprint for activity that may occur during the secure tunnel session. In one or more of the various embodiments, authenticity tokens may be generated based on the payload content, user identities, client identities, or the like, that may be associated with an overlay session. For example, if the secure tunnel session includes a response to a query, the authenticity token may be generated based on a hash of the response to the query. Among other things, in some embodiments, authenticity tokens may be employed as part of a scheme to determine the authenticity activity log information that may be stored elsewhere.

Also, in one or more of the various embodiments, egress agents, such as, egress agent 420 may be enabled to access resource servers or other services using credentials that may be provided from a credential management service, such as, credential management service 428. Accordingly, in some embodiments, infrastructure security computers, such as, infrastructure security computer 402 may be enabled to provide credential instructions to egress agents that require credentials to access target resources. In some embodiments, egress agents may be arranged to request or otherwise obtain credential instructions from infrastructure security computers. In some embodiments, the credential instructions may be acted upon by egress agents to enable access to protected target resources. Note, in some embodiments, credential instructions may dictate the one or more actions an egress agent may perform to obtain or utilize credentials that enable the egress agent to access protected resources. In some embodiments, the credential instructions may enable egress agents to activate or authenticate a client application that interacts with the target resource.

Further, in some embodiments, one or more portions of application protocol information forwarded from client 422 or ingress agent 418 may be incorporated with credential instructions to enable access to target resource servers.

Figure 5:
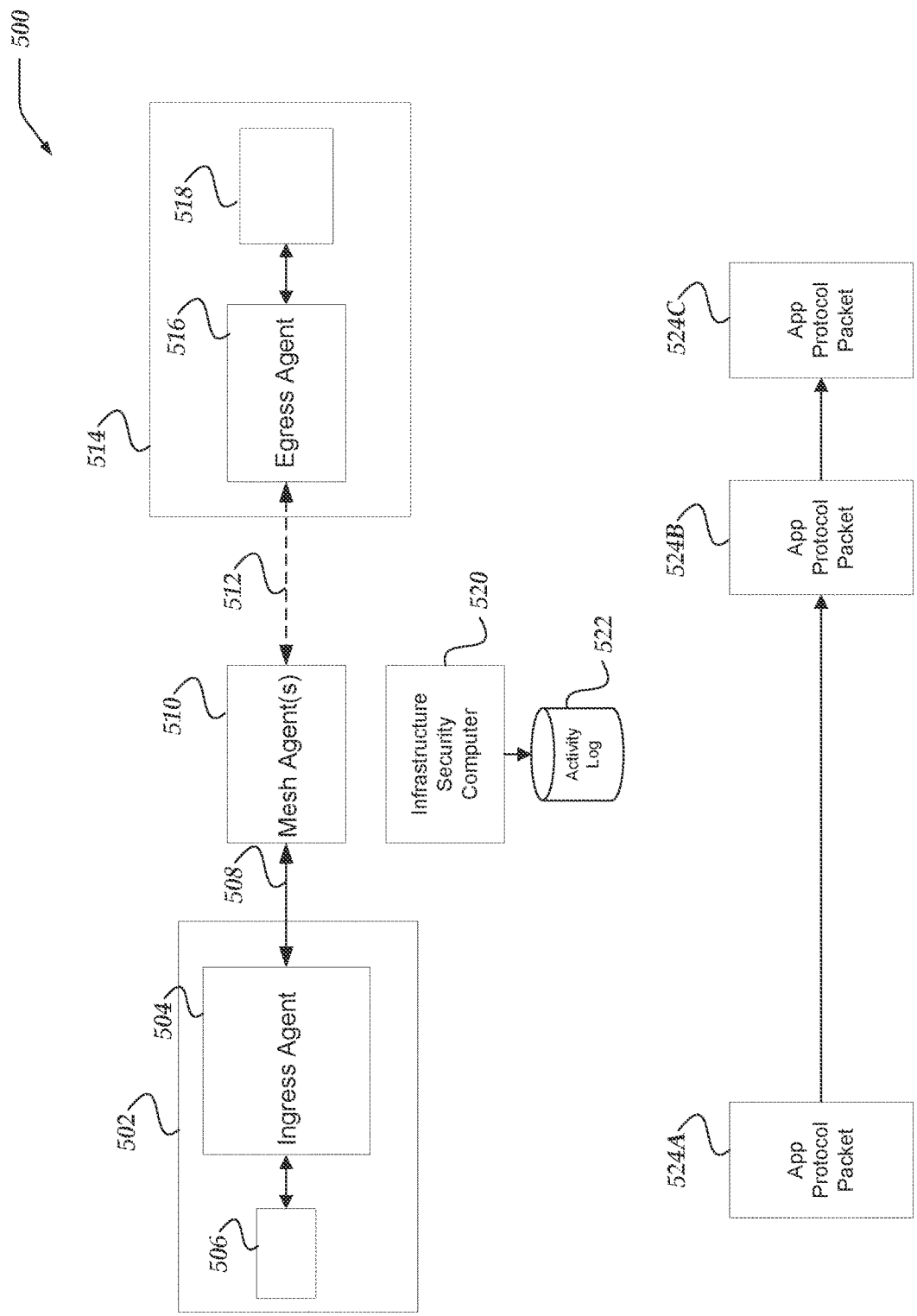
FIG. 5 illustrates a logical schematic of a system for credential management for distributed services in accordance with one or more of the various embodiments.

FIG. 5 illustrates a logical schematic of system 500 for credential management for distributed services in accordance with one or more of the various embodiments. In this example, for some embodiments, system 500 includes client computer 502, ingress agent 504, client application 506, mesh agent(s) 510, target resource computer 514, egress agent 516, resource server 518, infrastructure security server 520, activity log data store 522. Note, in some embodiments, ingress agents may be considered mesh agents that a client application employs to communicate via an overlay network. Similarly, in some embodiments, egress agents may be considered mesh agents that communicate with server applications. Note, as mentioned above, ingress agents and egress agents may be considered mesh agents that may provide ingress or egress of traffic in the overlay network. Thus, for brevity and clarity mesh agents may be referred to as ingress agents, egress agents, or mesh agents depending on their immediate role in an overlay communication session.

In this example, for some embodiments, network path 508 may represent communication over a single overlay network hop of a secure tunnel that may comprise one or more underlay network hops to reach the computer that is hosting mesh agent 510. Likewise, network path 512 may represent one or more overlay network hops (intervening mesh agents not shown) that reach target computer 514 and egress agent 516.

As described above, in some embodiments, mesh agents may be arranged to communicate with infrastructure security engines that may be hosted on infrastructure security computers, such as, infrastructure security computer 520. Also, in some embodiments, infrastructure security engines may be arranged to log overlay session activity into activity log data store 522.

In one or more of the various embodiments, client applications, such as, client application 506 may employ one or more application protocols to communicate with resource servers, such as, resource server 518. In some embodiments, application protocols may define particular data in particular arrangements or sequences that enable client applications to communicate with associated/related server applications. In some embodiments, two or more applications or services may share the same application protocol. Also, in some embodiments, one or more applications may employ unique or custom protocols to enable communication between clients or servers. In some embodiments, servers may provide one or more APIs or interfaces that enable applications to access the servers rather than requiring dedicated/proprietary client applications. In such circumstances, a program or service configured to employ such APIs or interfaces may be considered a client application.

In some embodiments, application protocol packets originating from client applications may be provided to ingress agents and subsequently forwarded through the overlay network until they reach the egress agent. Accordingly, in some embodiments, egress agents may be arranged to act as an endpoint to the connection from the client application.

In this example, for some embodiments, application protocol packet 524A represents one or more packets of network traffic that may be sent from a client application, such as, client application 506. Accordingly, the application protocol packet may be routed through the overlay network until it reaches its egress agent. In this example, application protocol packet 524B represents the application protocol packet at the egress agent for the client request. And, in this example, for some embodiments, application protocol packet represents application protocol packets sent from an egress agent to the target resource server.

In one or more of the various embodiments, egress agents may be arranged to re-write application protocol packets to enforce one or more requirements or one or more features of the overlay network. For example, if an application protocol defines one or more fields for holding credential information, egress agents may be arranged to insert the appropriate credential information into the application protocol packets before communicating them to the target resource server. Thus, in some embodiments, credential information provided by the client (if any) may be automatically replaced by other credential information determined by the egress agent.

Accordingly, in some embodiments, egress agents may be arranged to communicate with infrastructure security computers to obtain credential instructions that declare one or more actions the egress agent may perform to obtain or activate credential information to access the target resource server. In some embodiments, egress agents may be arranged to replace the credential information included in application protocol packet 524B (if any) with credential information determined based on credential instructions provided by its associated infrastructure security computer. Further, in some embodiments, egress agents may be arranged to perform one or more 'fix-up' operations on application protocol packet 524B, such as, computing hash signatures based on packet content, adjusting packet size field values, adjusting sequence numbers, adjusting packet offset/pointer values (e.g., values that point to the location of particular values or sections in a given packet), or the like. Accordingly, in some embodiments, application protocol packet 524C represent a modified packet that includes credential information as well as other packet modifications that may be required for a particular application protocol or credential mechanism.

Figure 6:
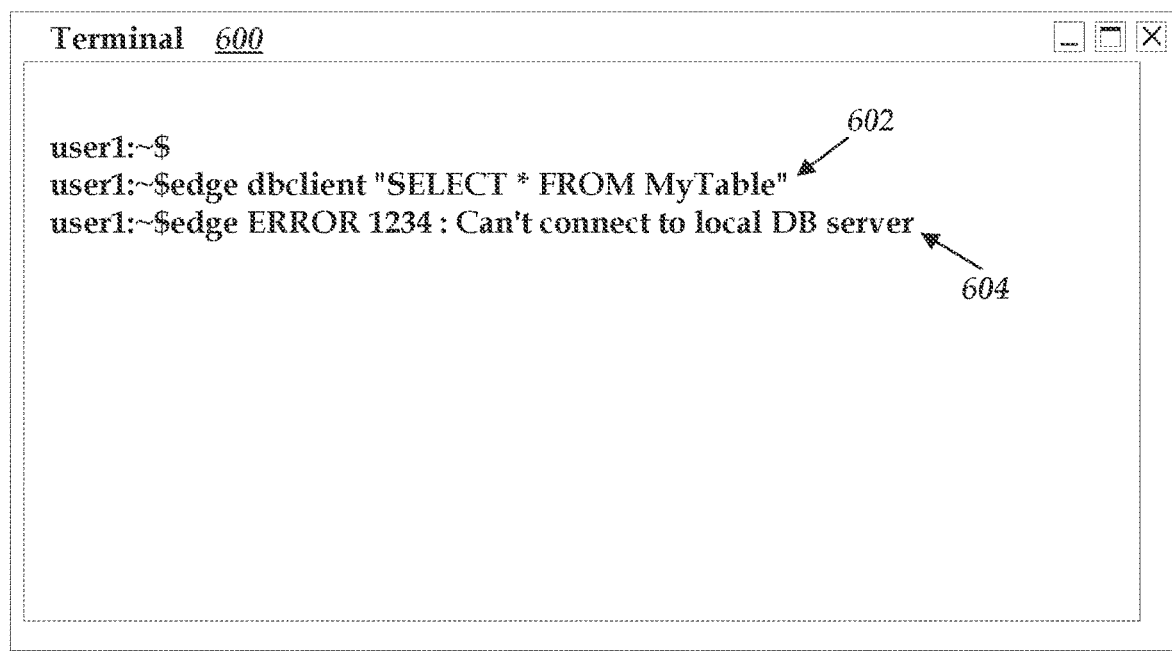
FIG. 6 illustrates logical schematic of a terminal and a shortcut for enabling client applications to access an overlay network in accordance with one or more of the various embodiments.
Figure 6:
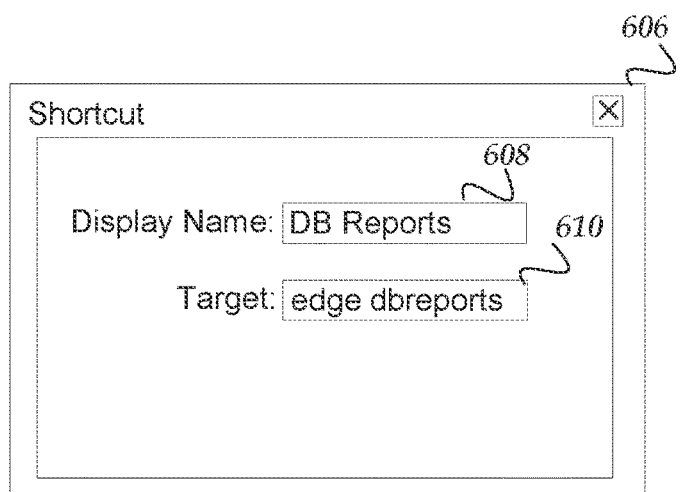

FIG. 6 illustrates logical schematic of terminal 600 and shortcut 606 for enabling client applications to access an overlay network in accordance with one or more of the various embodiments. In some embodiments, terminal 600 may represent a computer terminal application that enables users access to command-line interfaces for various applications. In this example, for some embodiments, command line 602 represents a command line that may be provided by a user. In this example, the user is attempting to retrieve data from a remote database using the program dbclient. In the example, the command 'dbclient' is shown as prefixed by the command 'edge'. Accordingly, in this example, the prefix represents a command to employ an ingress agent to execute the dbclient. Accordingly, in this example, rather than routing the dbclient command via the conventional underlay network, the ingress agent may capture the execution of dbclient and employ the overlay network to establish a secure tunnel for the requested operation.

Similarly, in some embodiments, shortcut 606 illustrates how a shortcut for a GUI based operating system or window manager may be configured to route commands initiated from a desktop (e.g., mouse-clicks) through secure tunnels in the overlay network. In this example, shortcut 606 includes an application display name, such as, display name 608 and a launch/execution command represented by target 610. Thus, in this example, shortcuts may be configured to enable launched applications to access the overlay network.

Note, often client applications may support users providing server identifiers (e.g., URIs, IP addresses, hostnames, or the like) that declare the server that for the client application. For example, a conventional command to launch a dbclient application may include the hostname where the database server of interest is located. However, for resources in the overlay network, the infrastructure security engines may determine the location of the server.

Figure 7:
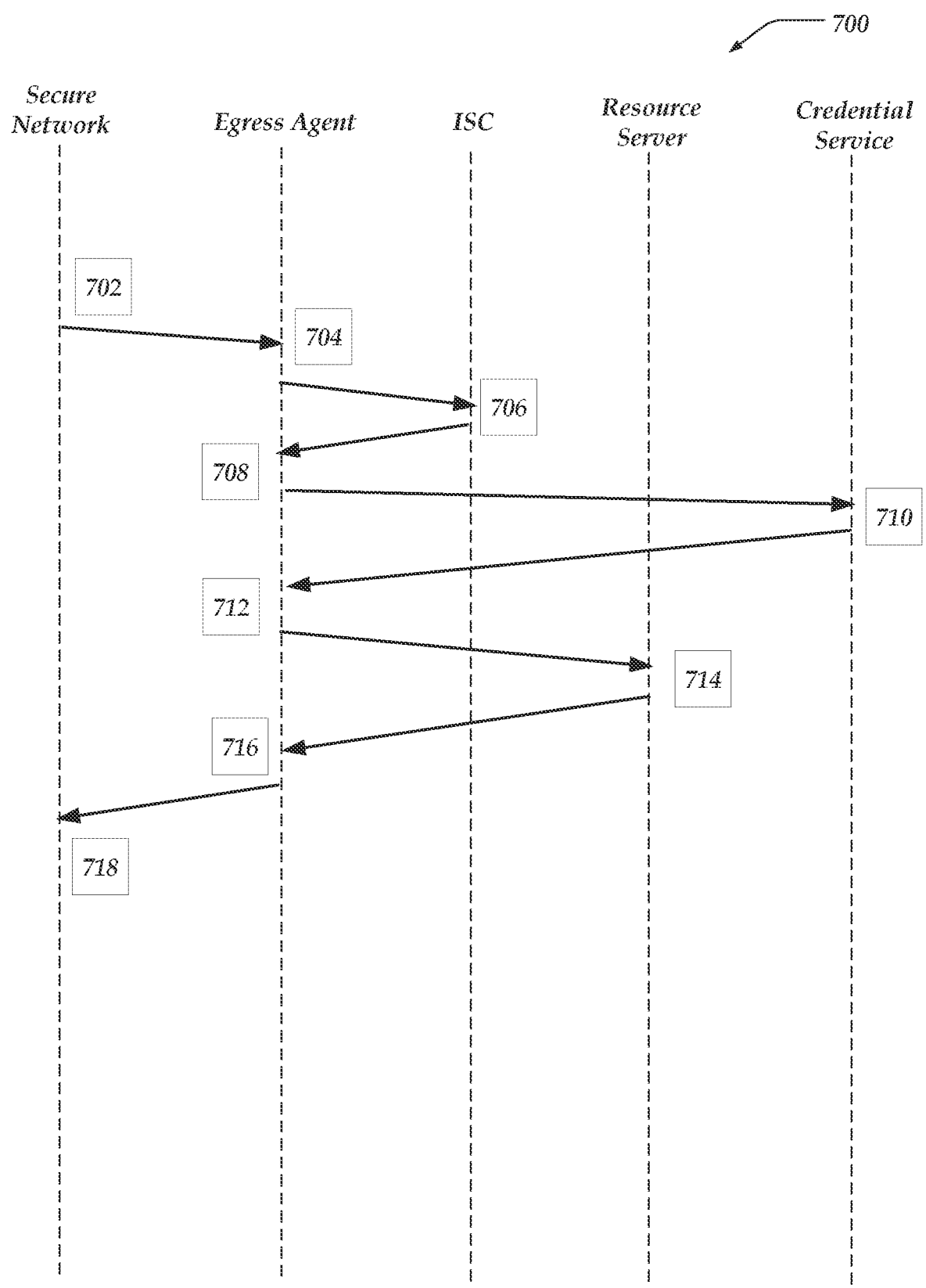
FIG. 7 illustrates a logical diagram of a sequence for credential management for distributed services in accordance with one or more of the various embodiments.

FIG. 7 illustrates a logical diagram of sequence 700 for credential management for distributed services in accordance with one or more of the various embodiments.

In one or more of the various embodiments, sequence 700 illustrates interactions between or among clients, servers, ingress agents, egress agents, infrastructure security engines, or the like. As described above, in some embodiments, ingress agents and egress agents may be mesh agents that are providing access to the overlay network for clients or services. Similarly, clients may be resources that are initiating a request directed to another resource and servers may be resources that may respond to a client request. Accordingly, resources may be clients or servers depending on their role at a particular moment.

At step 702, in one or more of the various embodiments, a client request may be routed over a network directed to a particular egress agent that may be associated with a managed resource or service. (Services or resources may hereinafter be referred to collectively as resources or resource servers.) Also, resources that a client may be attempting to communicate with may be referred to as target resources or target resource servers. The client application, ingress agent, and one or more intervening mesh agents of the network are not shown here. The secure network may be comprised of one or more software-defined networks, overlay networks, mesh networks, or the like, that may be assumed to be configured to route a client request to an egress agent associated with a target resource.

As described above, managed resources may be accessible via mesh agents. Accordingly, in some embodiments, the mesh agent associated with the client may be considered the ingress agent that enables the client to gain access to the secure network. And, in some embodiments, the egress agent may be a mesh agent that may be configured to directly access the target resource server.

At step 704, in one or more of the various embodiments, the client request may be provided to the egress agent. Accordingly, in some embodiments, similar to other mesh agents participating in the connection/session, the egress agent may be arranged to confirm that the client is authorized to access the target resource. Accordingly, in some embodiments, the egress agent may communicate with its infrastructure security computer to obtain confirmation that the client request is allowed to be provided to the target resource.

Also, in some embodiments, the egress agent may require credential instructions from the infrastructure security computer. As described above, egress agents may be arranged to follow the credential instructions to determine the credential information that enables the egress agent to access the target resource.

At step 706, in one or more of the various embodiments, the infrastructure security computer may determine if the client can access the resource server. Also, in some embodiments, since this request is coming from the egress agent, the infrastructure security computer may be arranged to provide credential instructions for the resource server. As described above, credential instructions may declare one or more actions that may be performed by the egress agent to enable the egress agent to access the target resource rather than including credential secrets directly.

At step 708, in one or more of the various embodiments, if the infrastructure security computer authenticates the user and the client request, the infrastructure security computer may provide credential instructions to the egress agent. Accordingly, in some embodiments, the egress agent may employ the credential instructions to determine the credential information that include user secrets that enable the egress agent forward the client request to the resource server.

In this example, the egress agent may be arranged to follow the credential instructions to communicate with a credential management service to obtain the necessary credential information. Note, in some embodiments, egress agents may be arranged to employ one or more credential recipes that may include the particular instructions or locations for obtaining credential information from particular credential vaults or credential management services.

At step 710, in one or more of the various embodiments, the credential service may provide credential information that the egress agent may employ to access the target resource. Note, in some embodiments, if the credential service rejects the request to obtain credential information, the client request may be declined, canceled, arrested, discarded, or the like, depending on the configuration of the secure overlay network.

At step 712, in one or more of the various embodiments, the egress agent may employ the client request and the credential information to access the target resource. In some embodiments, the egress agent may modify application protocol packets provided by the client to include some or all of the credential information that may enable the client request to be accepted or otherwise processed by the target resource.

In some embodiments, egress agents may be arranged to store the credential information in a local temporary cache. Accordingly, in some embodiments, if subsequent access requests may require the same credential information, the cached credential information may be employed. In some embodiments, one or more cache policies may be associated with the credential information cache. In some embodiments, such policies may include ageing policies that automatically remove/delete credential information from the cache they are not used within a declared time duration. In some embodiments, egress agents may be configured to employ rules, instructions, or the like, provided via configuration information for determining cache policies to account for local circumstances or local requirements. Also, in one or more of the various embodiments, infrastructure security computers may provide cache policy directives with or along-side the credential information. Accordingly, in one or more of the various embodiments, different credential information may be associated with different cache policies. Thus, in some embodiments, administrators may establish different cache policies for different users, different resources, or the like.

Further, in some embodiments, infrastructure security engines may be arranged to direct egress agents (e.g., send a command message) to delete cached credential information should a user or session loses their privilege to access the target resource.

At step 714, in one or more of the various embodiments, the resource server may receive the client request with credentials provided from the egress agent. Accordingly, in some embodiments, the resource server may process the client request. In one or more of the various embodiments, if the resource server provides a response, the response may be forwarded to the egress agent.

At step 716, in one or more of the various embodiments, the egress agent may be arranged to forward the resource server response back through a secure tunnel in the overlay network towards the ingress agent that corresponds to the client. In some embodiments, the resource server response may be forwarded through one or more intervening mesh agents that were determined to establish the secure tunnel between the egress agent and the ingress agent rather than validating the resource server response with the infrastructure security computer at each mesh agent.

Accordingly, in one or more of the various embodiments, mesh agents may be arranged to employ the secure tunnel for the session without validating the client or secure tunnel with the infrastructure security computer based on the validation/authentication performed to establish the secure tunnel.

At step 718, in one or more of the various embodiments, the overlay network may forward the server response to the ingress agent associated with the client. In some embodiments, that ingress agent may receive the server response via the overlay network and forward it to the client.

Figure 8:
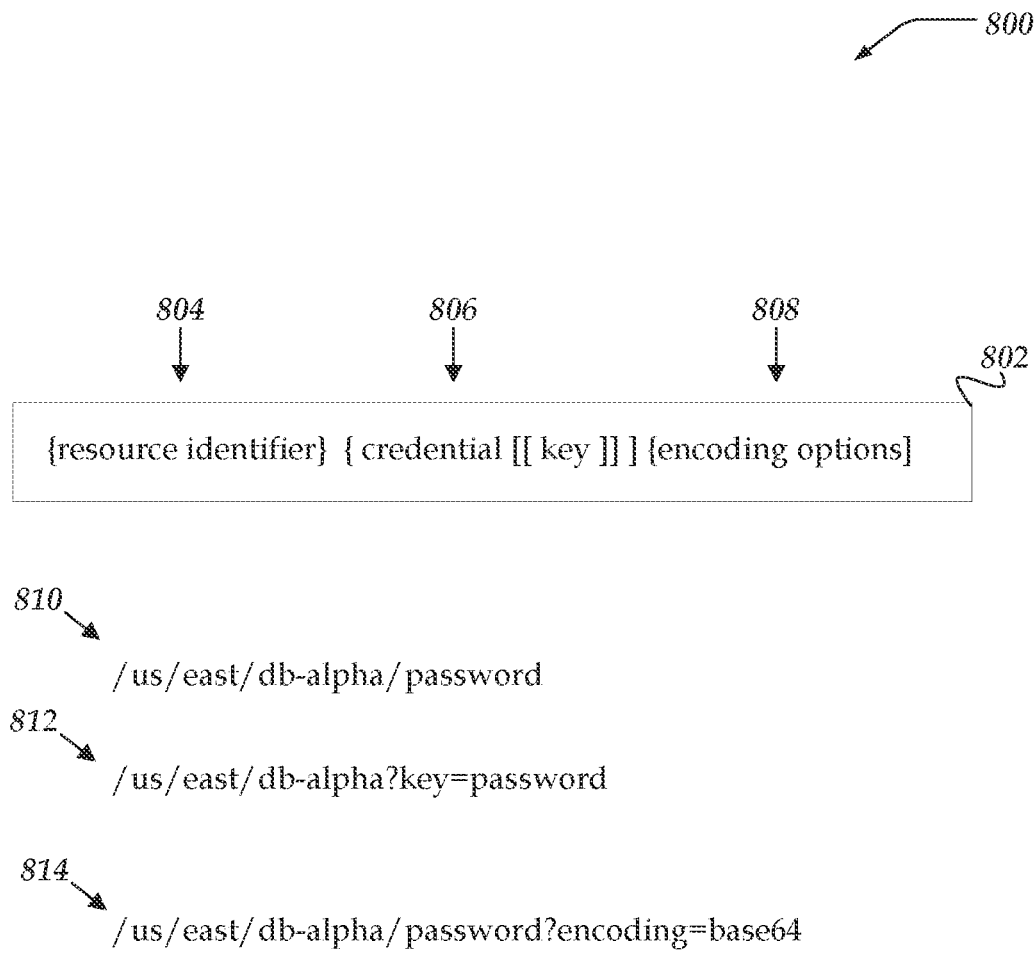
FIG. 8 illustrate logical examples of a credential instruction system for credential management for distributed services in accordance with one or more of the various embodiments.

FIG. 8 illustrate logical examples credential path system 800 for credential management for distributed services in accordance with one or more of the various embodiments. As described herein, in some embodiments, egress agents may be arranged to obtain credential instructions from infrastructure security computers. In some embodiments, credential instructions include information that may enable egress agents to obtain secrets that comprise credentials for accessing resource servers. In one or more of the various embodiments, egress agents may be arranged to employ credential information parsers to interpret credential instructions to determine one or more actions that may be performed to obtain the actual secret credentials that may be employed to access target resources.

In some embodiments, egress agents may be arranged to employ one or more credential instruction parsers to interpret credential instructions.

In this example, for some embodiments, credential instruction format 802 represents the components that may comprise one or more credential instructions. Accordingly, in this example, credential instruction format 802 includes various sections, including resource identifier 804, credential identifier 806, encoding options 808, or the like.

In this example, for some embodiments, credential instructions 810-814, include resource identifier '/us/east/db-apha' which may be considered to represent the identifier of a particular database resource. Similarly, the credential declared by credential instructions 810-814 is a credential named 'password'. In this example, credential instruction 812 employs 'key=password' which may support credential vaults that provide a credential information that includes more than one field. For example, a credential vault may provide two or more credential values in a JSON object, XML, or the like. Accordingly, in this example, the key value ('key=password') indicates the relevant field.

Also, in this example, credential instruction 814 may be considered similar to credential instruction 810 and credential instruction 812, however, credential instruction 814 includes an encoding indicator.

Note, in some embodiments, egress agents may be arranged to employ rules, grammars, libraries, plug-ins, extensions, or the like, provided via configuration information to determine how to interpret different types of credential instructions. Accordingly, in some embodiments, as different types of credential instruction formats may be determined or otherwise encountered, egress agents may be updated to interpret the different types of credential instruction formats. Similarity, egress agents may be arranged to in some embodiments, employ rules, grammars, libraries, plug-ins, extensions, or the like, provided via configuration information to determine how to interpret additional fields/components of existing credential instruction formats. In some cases, for some embodiments, the rules, grammars, libraries, plug-ins, extensions, or the like, employed for interpreting or executing credential instructions may be referred to as credential recipes.

Figure 9:
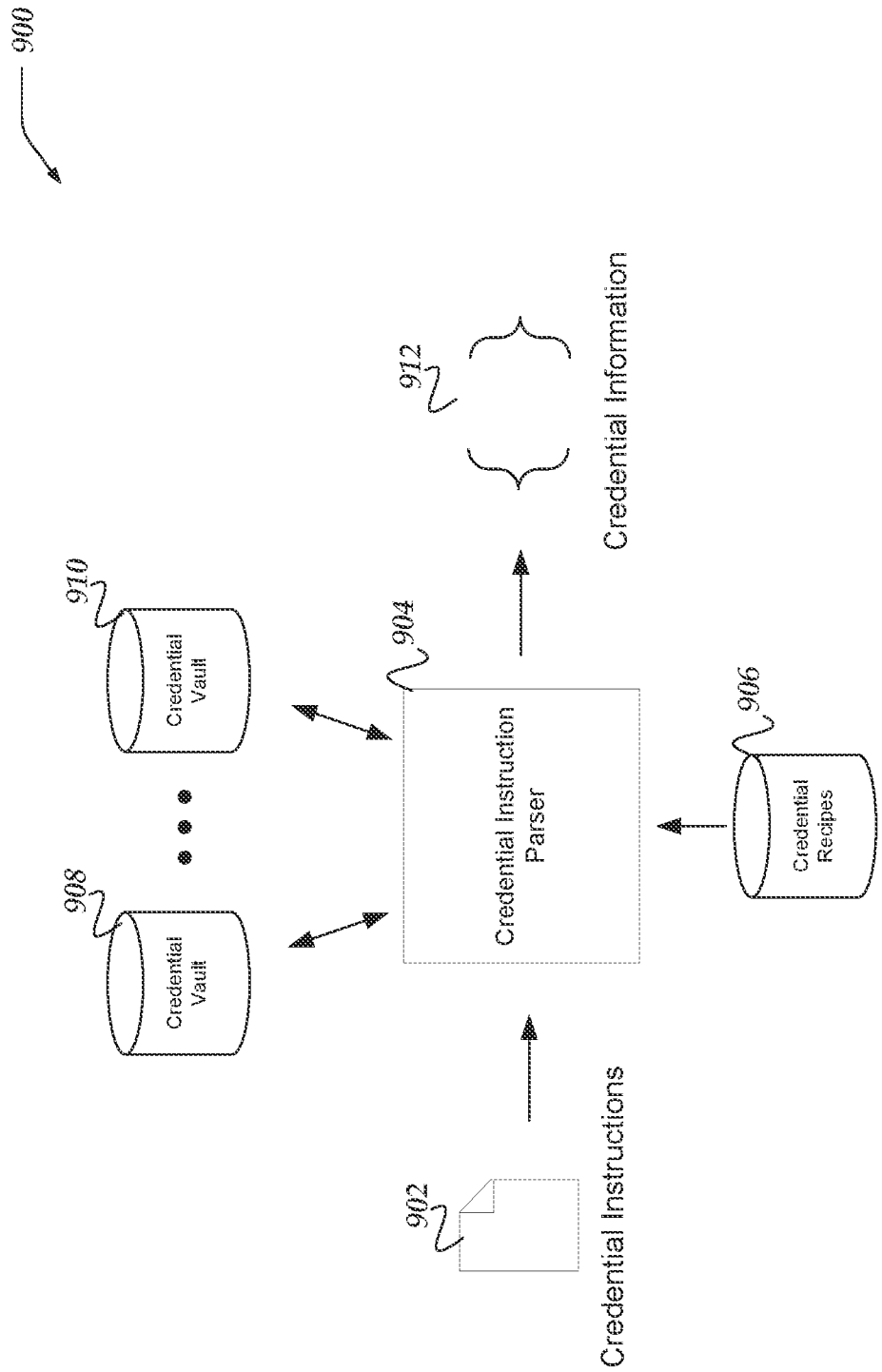
FIG. 9 illustrates a logical schematic of a system for obtaining credential information for credential management for distributed services in accordance with one or more of the various embodiments.

FIG. 9 illustrates a logical schematic of system 900 for obtaining credential information for credential management for distributed services in accordance with one or more of the various embodiments.

As described above, in some embodiments, egress agents may be arranged to request credential instructions from infrastructure security computers before continuing to process a client request to access target resources. Accordingly, in some embodiments, egress agents may be arranged to provide the obtained credential instructions, such as, credential instructions 902 to credential instruction parsers, such as, credential instruction parser 904. In some embodiments, credential instruction parser 904 may be arranged to determine one or more credential recipes from credential recipe data store, such as, credential recipes 906. Thus, in some embodiments, credential instruction parsers may be arranged to interpret the credential instructions in view of the credential recipes. For example, in some embodiments, credential recipes may declare a domain specific language and corresponding actions that egress agents may employ to interpret a given credential instruction. In some embodiments, one or more credential recipes may be considered built-in with extensions enabled by providing the appropriate rules, grammars, libraries, plug-ins, extensions, or the like, via configuration information to account for local requirements or local circumstances.

In one or more of the various embodiments, credential instruction parsers may employ the credential instructions and credential recipes to access one or more credential values, such as, credential vault 908, credential vault 910, or the like. In some embodiments, credential vault 908 or credential vault 910 may represent various credential management services, including LDAP services, security appliances, or the like. In some embodiments, credential vaults may be services or locations where an organization stores credential information (with secrets) that egress agents may employ to access target resource servers on behalf of clients that submit client requests.

In one or more of the various embodiments, if credential instructions 902 may be parsed and the prescribed actions performed, credential information 912 may be obtained or determined from one or more credential vaults. Accordingly, in some embodiments, credential information may include the secrets needed for accessing a target resource.

Figure 10:
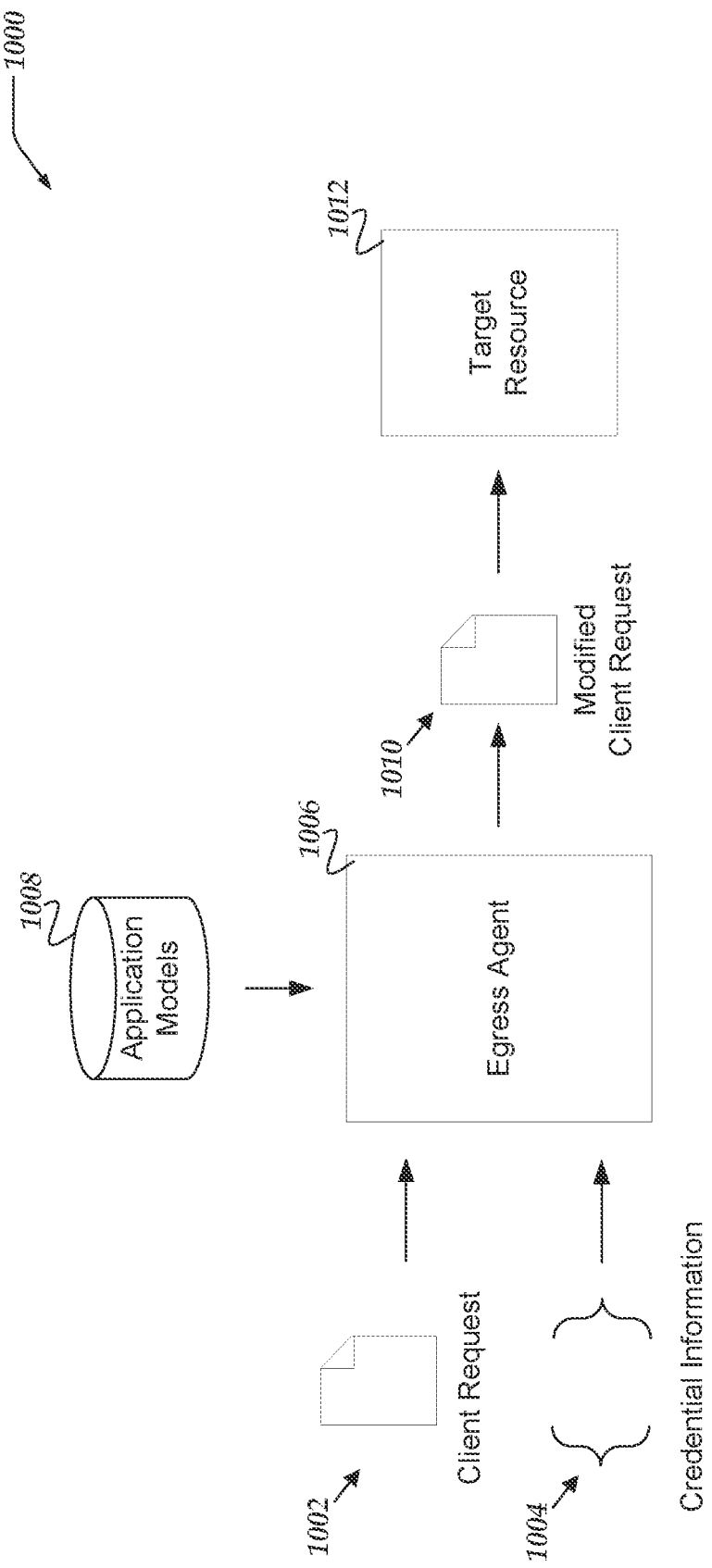
FIG. 10 illustrates a logical schematic of a system for credential management for distributed services in accordance with one or more of the various embodiments.

FIG. 10 illustrates a logical schematic of system 1000 for credential management for distributed services in accordance with one or more of the various embodiments. As described above, in some embodiments, client requests, such as, client request 1002 and credential information, such as, credential information 1004 may be provided to egress agents, such as, egress agent 1006. Accordingly, in some embodiments, egress agents may be arranged to employ one or more application models, such as, application models 1008 to determine how to modify the original client request into a modified client request, such as, client request 1010. Thus, in some embodiments, the modified client request (which may include one or more credential secrets) to a target resource, such as, target resource 1012. Accordingly, in some embodiments, egress agents may enable the client request to be provided to the target resource without the client application (or ingress agent) accessing or holding the credential information.

In one or more of the various embodiments, different application protocols may require different modifications that are specific to the particular application protocol, client request, applications, or the like. Accordingly, in some embodiments, egress agents may be arranged to employ one or more application models, such as, application models 1008 that declare the particular modifications for particular applications or client requests. For example, in some embodiments, an application model may resemble a template or mask that identifies which credential information value may be inserted into the client request. Alternative, in some embodiments, application models may comprise computer readable instructions that dictate the actions the egress agents may perform to obtain or activate credential information.

Generalized Operations

FIGS. 11-15 represent generalized operations for credential management for distributed services in accordance with one or more of the various embodiments. In one or more of the various embodiments, processes 1100, 1200, 1300, 1400, and 1500 described in conjunction with FIGS. 11-15 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environment. However, embodiments are not so limited and various combinations of network computers, client computers, or the like may be utilized. Further, in one or more of the various embodiments, the processes described in conjunction with FIGS. 11-15 may be used for credential management for distributed services accordance with at least one of the various embodiments or architectures such as those described in conjunction with FIGS. 4-10. Further, in one or more of the various embodiments, some or all of the actions performed by processes 1100, 1200, 1300, 1400, and 1500 may be executed in part by overlay network engine 322, one or more mesh agents, such as, mesh agent 324, or the like, running on one or more processors of one or more network computers.

Figure 11:
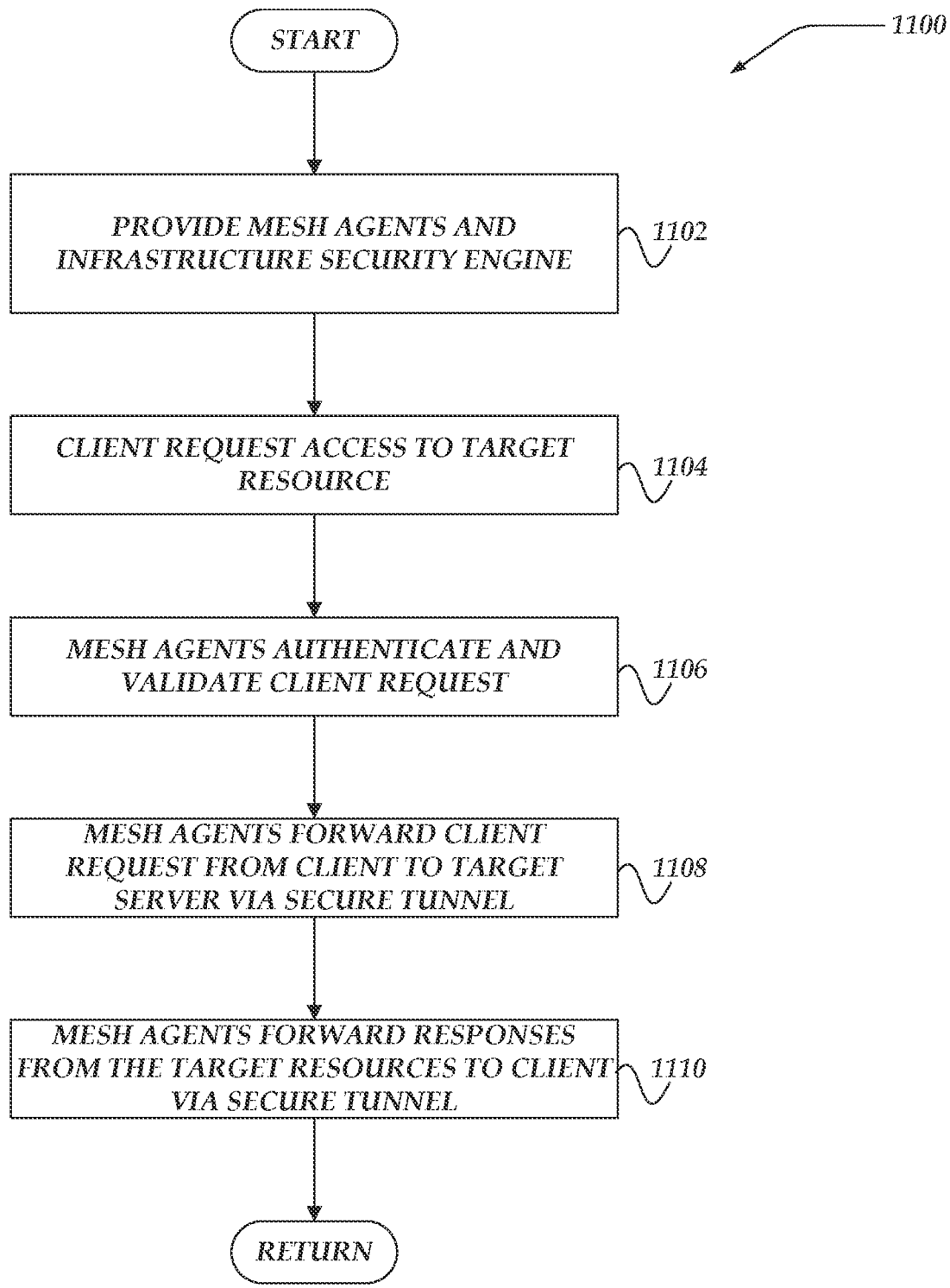
FIG. 11 illustrates an overview flowchart of a process for managing and monitoring infrastructure access in networked environments in accordance with one or more of the various embodiments.

FIG. 11 illustrates an overview flowchart of process 1100 for managing and monitoring infrastructure access in networked environments in accordance with one or more of the various embodiments. After a start block, at block 1102, in one or more of the various embodiments, one or more mesh agents and one or more infrastructure security engines may be provided. At block 1104, in one or more of the various embodiments, mesh agents may be provided a client request to access a target resource. At block 1106, in one or more of the various embodiments, mesh agents may be arranged to communicate with one or more infrastructure security engines to authenticate or validate the client requests. At block 1108, in one or more of the various embodiments, mesh agents may be arranged to forward validated/authenticated client requests to target resources via a secure tunnel in the overlay network. At block 1110, in some embodiments, mesh agents may be arranged to forward responses from the target resource to the client via the secure tunnel. Next, in one or more of the various embodiments, control may be returned to a calling process.

Figure 12:
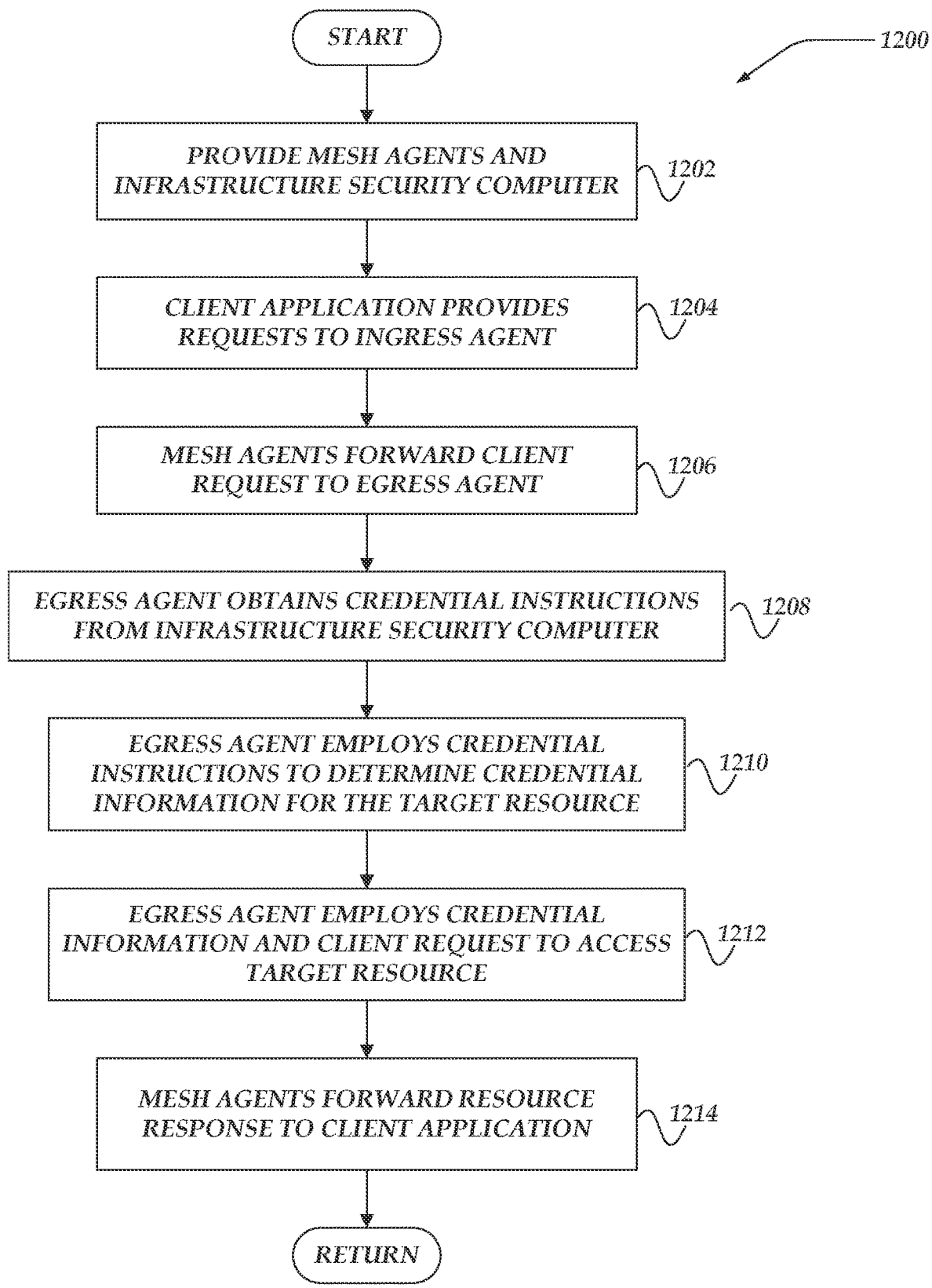
FIG. 12 illustrates a flowchart of a process for credential management for distributed services in accordance with one or more of the various embodiments.

FIG. 12 illustrates a flowchart of process 1200 for credential management for distributed services in accordance with one or more of the various embodiments. After a start block, at block 1202, in one or more of the various embodiments, an overlay network that includes one or more mesh agents and at least one infrastructure security computer. In one or more of the various embodiments, one or more mesh agent, infrastructure security computers, or the like, that comprise an overlay network may be deployed and configured across one or more underlay networks of an organization. In some embodiments, configuring the overlay network may include declaring access privileges, security policies, routes, resource protection, or the like, that may be enforced by the overlay network.

At block 1204, in one or more of the various embodiments, a client application may provide one or more client requests to an ingress agent. As described above, in some embodiments, client applications may be configured to route requests (and receive responses) through one or more mesh agents that may act as ingress agents depending on the configuration or the overlay network.

At block 1206, in one or more of the various embodiments, one or more mesh agents (including the ingress agent) may be arranged to forward the client request to the egress agent associated with the target resource. As described above, a core responsibility of the overlay network is too determine a route between the ingress agent and egress agent. Accordingly, in some embodiments, communication between client applications and target resource servers may be routed through the overlay network which may be implemented on an underlay network that provides the actual connectivity between nodes (e.g., mesh agents) in the overlay network.

At block 1208, in one or more of the various embodiments, egress agents may be arranged to obtain credential instructions from the infrastructure security computer. As described above and in more detail below, egress agents may employ credential instructions to determine how to obtain or activate credential information that provides access to the target resource server. Accordingly, the infrastructure security computer, egress agent, or the like, may be restricted from having direct access or possession of credential secrets.

At block 1210, in one or more of the various embodiments, egress agents may be arranged to employ the credential instructions to determine the credential information that may enable access to the target resource.

As described above, egress agents may be arranged to parse credential instructions to determine various actions, locations, options, or the like, that may be applied to obtain credential information. In some embodiments, egress agents may be arranged to support different credential recipes that may be configured to interpret credential instructions. For example, in some embodiments, credential instructions may be interpreted to execute one or more API calls of one or more credential vaults to obtain credential information associated with the target resource server. In some embodiments, credential instructions may point to shared location where credential information, such as, security certificates, or the like, may be located.

At block 1212, in one or more of the various embodiments, egress agents may be arranged to employ the credential information and the client request to access the target resource. In some embodiments, egress agents may be arranged to modify client requests to include one or more secrets from the credential information. Accordingly, in some embodiments, the modified client request may be employed to access the target resource server. Note, the particular modifications to the client request may be determined based on an application model that provides the instructions/rules for modifying the client request.

At block 1214, in one or more of the various embodiments, mesh agents may be arranged to forward responses from the target resource to the client application that made the client request. In some embodiments, if the target resource provides a response to the client request, the egress agent may be arranged to collect the response forward it back to the client application via the overlay network.

Next, in one or more of the various embodiments, control may be returned to a calling process.

Figure 13:
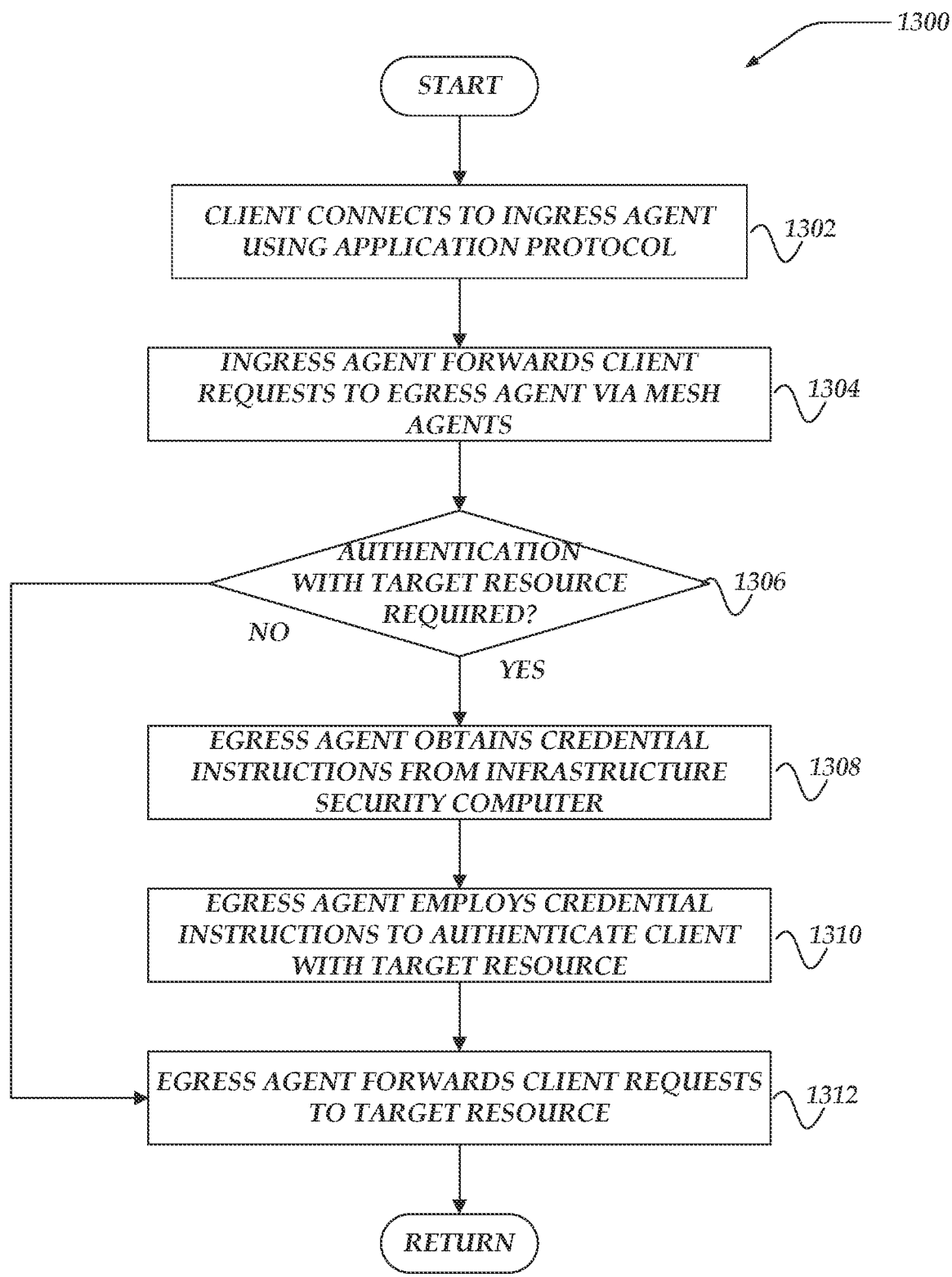
FIG. 13 illustrates a flowchart of a process for credential management for distributed services in accordance with one or more of the various embodiments.

FIG. 13 illustrates a flowchart of process 1300 for credential management for distributed services in accordance with one or more of the various embodiments. After a start block, at block 1302, in one or more of the various embodiments, client application may be enabled to connect to ingress agent using application protocol. As described above, in some embodiments, client applications may have requests or other communication routed through a mesh agent of an overlay network. The mesh agents that the client application employs to gain access the overlay network may be considered the ingress agent.

At block 1304, in one or more of the various embodiments, ingress agents may be arranged to forward the client request to an egress agent via one or more mesh agents that comprise an overlay network. In some embodiments, overlay networks may include features that enable the routing of requests or responses between clients and servers configured to use the overlay network. In some embodiments, infrastructure security computers, or the like, may be configured to declare various rights, privileges, access restrictions, preferred/denied routes, or the like, that enable one or more clients to access one or more resource servers via the overlay network.

In one or more of the various embodiments, an application protocol for a particular client applications or resource server may require specialized handling. Accordingly, in some embodiments, ingress agents may be arranged to employ application models that declare one or more instructions for processing client requests for a particular application. In some cases, for some embodiments, client requests may be captured and forwarded through the overlay network. Also, in some cases, specialized pre-processing may be required to modify to the client request before the client request may be forwarded. For example, in some embodiments, an application protocol may require credential information to be included in the initial request (rather the being determined further downstream). In this example, the ingress agent may be configured provide one or more pre-selected credential secrets that may be replaced at the downstream egress agent rather than omitting the credential secrets from the client request. Accordingly, in some embodiments, application models may be arranged to include specialized instructions that may be executed to prepare client requests for particular applications to be forwarded to the egress agent.

At decision block 1306, in one or more of the various embodiments, if authentication with the target resource may be required, control may flow to block 1308; otherwise, control may flow to block 1312.

In some cases, for some embodiments, providing the client request to the target resource may not require authentication using credential information. Accordingly, in some embodiments, while the overlay network may provide access control/authentication that enables or disable clients/users from accessing a target resource over the overlay network. In some cases, the access to the resource server via the overlay network may remain unrestricted to access request coming over the overlay network.

However, in some embodiments, one or more target resource servers may require additional credential information to authenticate client requests with the one or more target resource servers.

At block 1308, in one or more of the various embodiments, egress agents may be arranged to obtain credential instructions from an infrastructure security computer. As described above and in more detail below, egress agents may employ credential instructions to determine how to obtain or activate credential information that provides access to the target resource server. Accordingly, the infrastructure security computer, egress agent, or the like, may be restricted from having direct access or possession of credential secrets.

At block 1310, in one or more of the various embodiments, egress agents may be arranged to employ the credential instructions to authenticate client with target resource. As described above and in more detail below, in some embodiments, egress agents may employed the credential instructions to obtain or active credential information that include the secrets that may be required for accessing the target resource server.

At block 1312, in one or more of the various embodiments, egress agents may be arranged to forward the client request to the target resource. In one or more of the various embodiments, egress agents may include the secrets included in the credential information with the client request. In some cases, for some embodiments, egress agents may be arranged to employ application models to determine how to include the credential information in or with the client request.

Next, in one or more of the various embodiments, control may be returned to a calling process.

Figure 14:
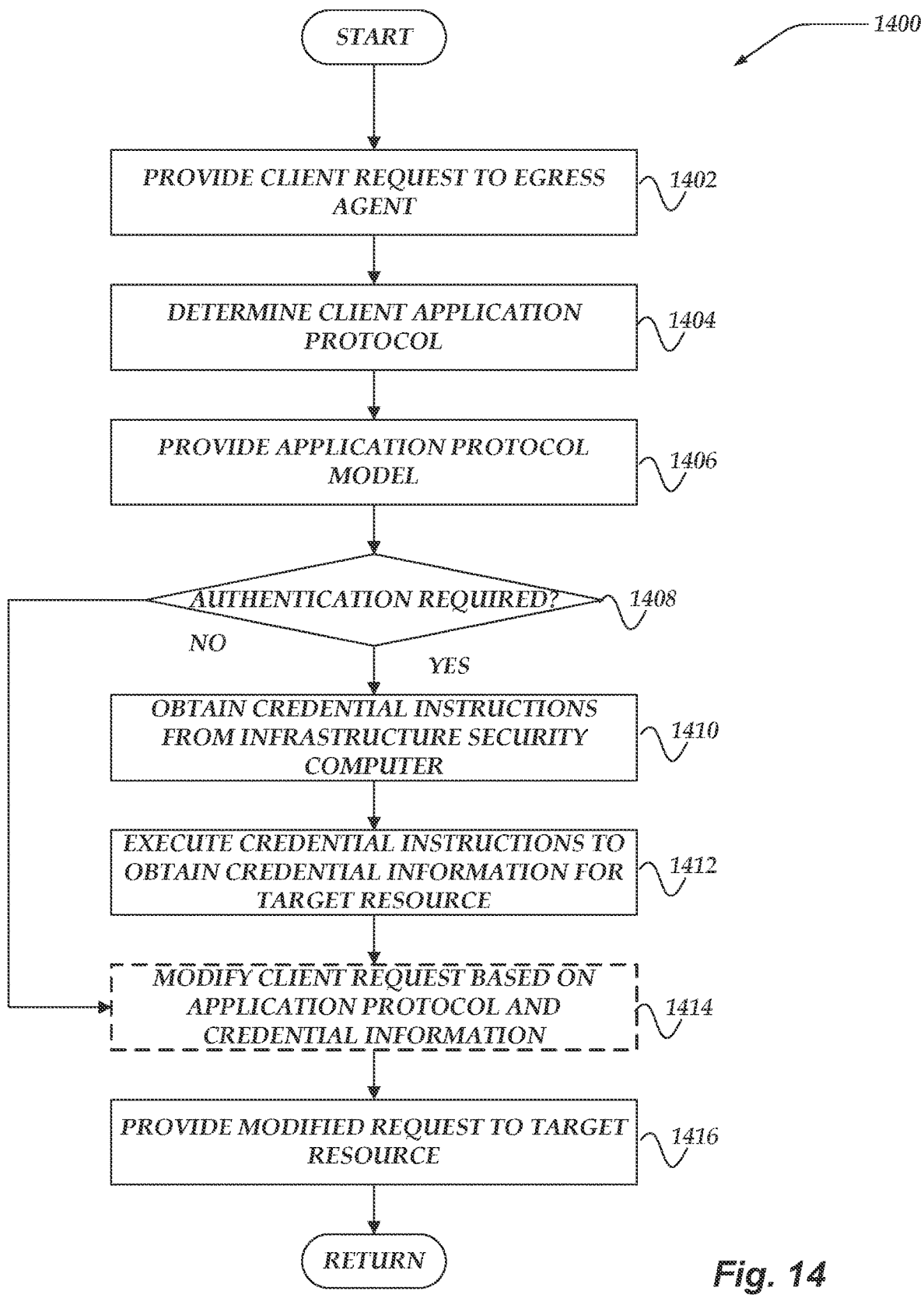
FIG. 14 illustrates a flowchart of a process for credential management for distributed services in accordance with one or more of the various embodiments.

FIG. 14 illustrates a flowchart of process 1400 for credential management for distributed services in accordance with one or more of the various embodiments. After a start block, at block 1402, in one or more of the various embodiments, a client request may be provided to an egress agent. As described above, client requests initiated at an ingress agent may be routed over one or more mesh agents the client requests may be provided to an egress agent associated with a resource targeted by the client application. Further, in some embodiments, as described above, the egress agent may be a mesh agent that is configured or recognized as being the endpoint in the overlay network that is enabled to access the target resource server.

At block 1404, in one or more of the various embodiments, egress agents may be arranged to determine the application protocol associated with the client request. As described above, client applications may be attempting to communicating with a target resource using an application protocol associated with or otherwise supported by the target resource. In some embodiments, information conveyed via application protocols may be carried between clients and servers using one or more transport protocols. In some embodiments, an overlay network that connects the ingress agent associated with the client application with the egress agent associated with the target resource. In one or more of the various embodiments, the particular route or path from the ingress agent to the egress agent may be determined by the overlay network configuration/administration (e.g., infrastructure security computers).

Accordingly, in some embodiments, egress agents may be arranged to analyze network traffic associated with the client request to determine or confirm the particular application protocol used for the communication between the client application and resource server. In some cases, for some embodiments, the application protocol may be determined based on the client applications or resource servers involved in the communication. Also, in some embodiments, egress agents may determine the application protocol from one or more fields/values included in the communicated network traffic.

At block 1406, in one or more of the various embodiments, egress agents may be arranged to provide an application model associated with the application protocol. In some embodiments, application models may be data structures that include or declare one or more instructions for credential management for distributed services adapted to a particular application or application protocol. In some embodiments, application models may include information for determining which fields in a packet of application protocol network traffic may require modification to support injection of credential secrets into the application protocol traffic.

At decision block 1408, in one or more of the various embodiments, if authentication may be required, control may flow block 1410; otherwise, control may flow to block 1414.

In some cases, for some embodiments, providing the client request to the target resource may not require authentication using credential information. Accordingly, in some embodiments, while the overlay network may provide access control/authentication that enables or disable clients/users from accessing a target resource over the overlay network. In some cases, the access to the resource server via the overlay network may remain unrestricted to access request coming over the overlay network.

However, in some embodiments, one or more target resource servers may require additional credential information to authenticate client requests with the one or more target resource servers.

At block 1410, in one or more of the various embodiments, egress agents may be arranged to obtain credential instructions from an infrastructure security computer. As described above, in some embodiments, infrastructure security computers may maintain a repository of credential instructions that may be employed to obtain or activate credential information that may enable access to target resource servers.

Accordingly, in some embodiments, egress agents may be arranged to communicate with an associated infrastructure security computer to obtain credential instructions that may correspond to the client request.

In some embodiments, infrastructure security computers may be arranged to provide one or more interfaces or APIs that enable egress agents to request credential instructions. Accordingly, in some embodiments, egress agents may be arranged to provide a message that includes information, such as, user identity, client application, target resource server, or the like, to its infrastructure security computer. In some embodiments, the infrastructure security computer may be arranged to confirm if the client request may be forwarded to the target resource server. In some embodiments, the confirmation may be performed as part of the traffic routing process of the overlay network. For example, in some embodiments, the validation process that may enable the client request to be forwarded to the egress agent may include determining if the user/client can access the target resource server.

Accordingly, in response to authenticating the client request or in response to a direct request from the egress agent, the infrastructure security computer may determine the credential instructions and provide them to the egress agent.

Note, in some embodiments, egress agents may be configured to support one or more APIs or interfaces provided by infrastructure security computers. In some cases, egress agents may be arranged to employ rules or instructions provided via configuration information to account for local requirements or local circumstances.

As described above, credential instructions may be provided using credential path strings or other structured formats.

At block 1412, in one or more of the various embodiments, egress agents may be arranged to execute the credential instructions to obtain credential information for the target resource. As described above, egress agents may be arranged to parse credential instructions to determine various actions, locations, options, or the like, that may be applied to obtain credential information. In some embodiments, egress agents may be arranged to support different credential recipes that may be configured to interpret credential instructions. For example, in some embodiments, credential instructions may be interpreted to execute one or more API calls of one or more credential vaults to obtain credential information associated with the target resource server. In some embodiments, credential instructions may point to shared location where credential information, such as, security certificates, or the like, may be located.

At block 1414, in one or more of the various embodiments, optionally, egress agents may be arranged to modify the client request based on the application model and the credential information.

In some cases, for some embodiments, applying the credential information to a given client request to a particular resource server may require the client request itself to be modified. For example, in some embodiments, the application protocol used for the client request may require credential information to be included in particular fields of the client request. Accordingly, in some embodiments, egress agents may be arranged to locate particular fields in the client request and inject credential information. For example, a client request using a particular application protocol may require a username and password to be included in specific fields of the client request. Likewise, in some embodiments, other fields in the client request, such as, hash digests, checksums, internal offset values, or the like, may require updating or modification if other fields in the client request are modified.

In one or more of the various embodiments, different application protocols may require different modifications that are specific to the particular application protocol, client request, applications, or the like. Accordingly, in some embodiments, egress agents may be arranged to employ one or more application models that declare the particular modifications for particular applications or client requests. For example, in some embodiments, an application model may resemble a template or mask that identifies which credential information value may be inserted into the client request.

Note, this block is indicated as being optional because in some cases, for some embodiments, the client request may not require modification. Or, in some cases, authenticating with the target resource may involve one or more actions separate from modifying the client request.

At block 1416, in one or more of the various embodiments, egress agents may be arranged to provide to the modified client request to the target resource. In some embodiments, egress agents may be arranged to communicate with target resource servers as if they are the client. In some embodiments, for some applications, egress agents may provide a command-line command that includes the request information provided by the requesting client and one or more portions of the credential information. In some embodiments, this command-line command may be executed locally by the resource server.

In some embodiments, for other applications, egress agents may communicate with the resource server using inter-process communication or network communication (e.g., TCP/IP, sockets, UNIX sockets, pipes, or the like) similar to how a conventional client application may communicate with a resource server.

Next, in one or more of the various embodiments, control may be returned to a calling process.

Figure 15:
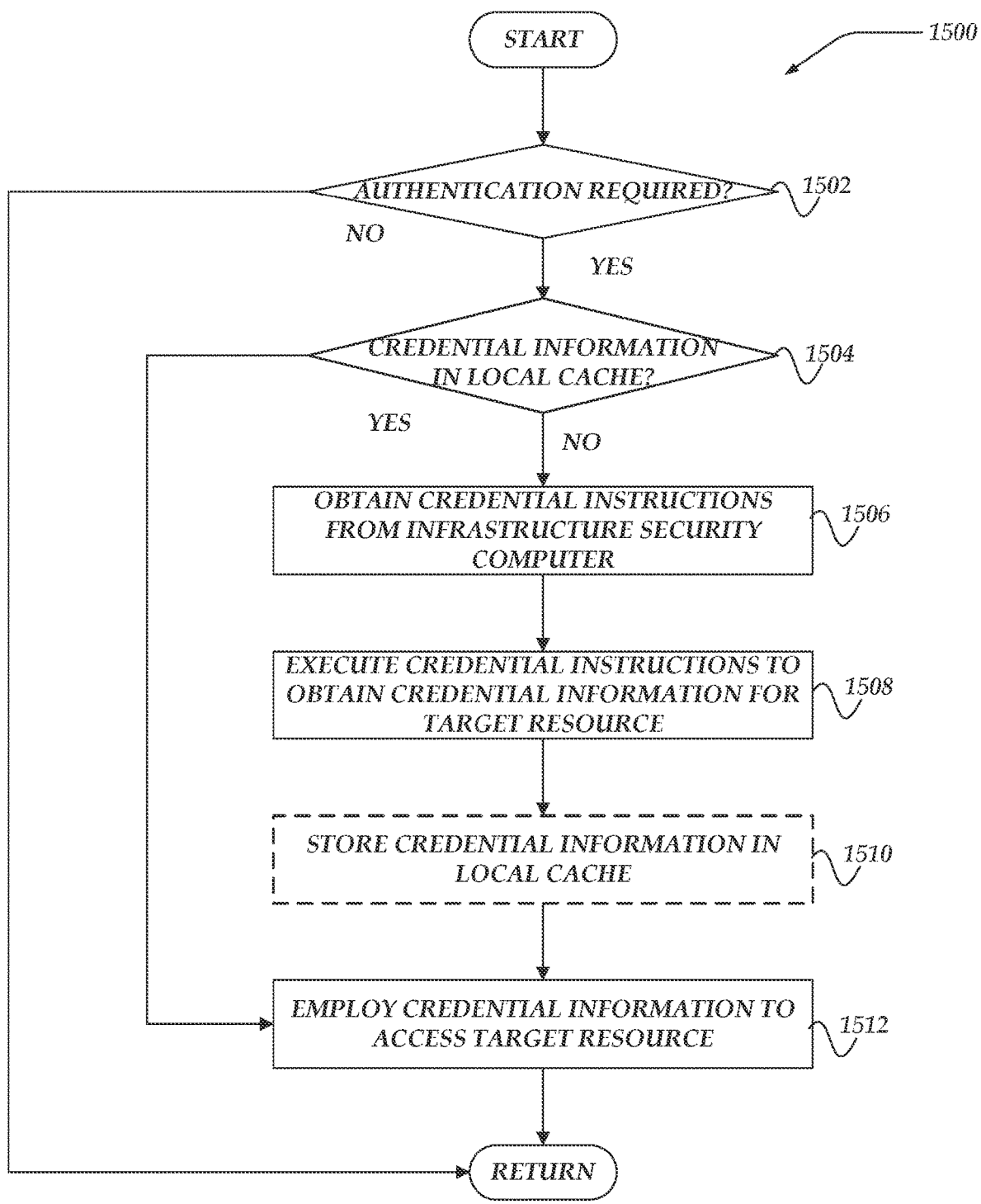
FIG. 15 illustrates a flowchart of process 1500 for credential management for distributed services in accordance with one or more of the various embodiments.

FIG. 15 illustrates a flowchart of process 1500 for credential management for distributed services in accordance with one or more of the various embodiments. In some embodiments, process 1500 may be considered in view of process 1400 described above. Thus, at least for brevity and clarity, redundant detailed descriptions are omitted here.

After a start block at decision block 1502, in one or more of the various embodiments, if the access request requires authentication, control may flow to decision block 1504; otherwise, control may be returned to a calling process.

At decision block 1504, in one or more of the various embodiments, if the egress agent may obtain the credential information for the request from its local credential information cache, control may flow to block 1512; otherwise, control may flow to block 1506.

At block 1506, in one or more of the various embodiments, egress agents may be arranged to obtain credential instructions from an infrastructure security computer. As described above, in some embodiments, infrastructure security computers may maintain a repository of credential instructions that may be employed to obtain or activate credential information that may enable access to target resource servers.

At block 1508, in one or more of the various embodiments, egress agents may be arranged to execute the credential instructions to obtain credential information for the target resource. As described above, egress agents may be arranged to parse credential instructions to determine various actions, locations, options, or the like, that may be applied to obtain credential information.

At block 1510, in one or more of the various embodiments, optionally, egress agents may be arranged to the credential information in a local credential information cache.

In some embodiments, egress agents may be arranged to store the credential information in a local temporary cache. Accordingly, in some embodiments, if subsequent access requests may require the same credential information, the cached credential information may be employed. In some embodiments, one or more cache policies may be associated with the credential information cache. In some embodiments, such policies may include ageing policies that automatically remove/delete credential information from the cache they are not used within a declared time duration. In some embodiments, egress agents may be configured to employ rules, instructions, or the like, provided via configuration information for determining cache policies to account for local circumstances or local requirements. Also, in one or more of the various embodiments, infrastructure security computers may provide cache policy directives with or along-side the credential information. Accordingly, in one or more of the various embodiments, different credential information may be associated with different cache policies. Thus, in some embodiments, administrators may establish different cache policies for different users, different resources, or the like.

Further, in some embodiments, infrastructure security engines may be arranged to direct egress agents (e.g., send a command message) to delete cached credential information should a user or session loses their privilege to access the target resource.

Note, this block is indicated as being optional because caching the credential information may be determined based on cache policies provided or otherwise managed by the infrastructure security computer.

At block 1512, in one or more of the various embodiments, egress agents may be arranged to employ the credential information to access the target resource.

Next, in some embodiments, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing access to network resources in a network using one or more processors that are configured to execute instructions, wherein the execution of the instructions enables performance of actions, comprising:
   determining credential information to access a resource server based on credential instructions and a client request received by a mesh agent on an overlay network that includes a plurality of mesh agents;
   communicating the client request and the credential information to the resource server via the mesh agent; and
   in a response to the client request generated by the resource server, forwarding the response to the client over the overlay network via the mesh agent.

2. The method of claim 1, wherein the plurality of mesh agents further comprises:
   hosting one or more of the mesh agents on one or more network computers.

3. The method of claim 1, wherein communicating the client request further comprises:
   generating a secure tunnel over the overlay network for communication between the client and the resource server.

4. The method of claim 1, wherein determining the credential information, further comprises:
   determining an interpretation of the credential instructions based on one or more of a grammar or a ruleset based on the credential instructions and the client request;
   determining one or more actions to access the credential information based on the interpretation of the credential instructions, wherein the one or more actions are executed to determine the credential information.

5. The method of claim 1, further comprising:
   determining actions on how to activate credential information to gain access to the resource server based on the credential instructions.

6. The method of claim 1, further comprising:
determining one or more application protocols employed for communication between the client and the resource server based on network traffic; and
generating one or more application models to provide instructions for credential management for distributed services based on the one or more application protocols.

7. The method of claim 1, further comprising:
generating one or more application models that include information for determining one or more fields to modify for injection of credential secrets in application protocol network traffic between the client and the resource server.

8. A system for method for managing access to network resources, comprising:
a network computer, comprising:
memory that stores at least instructions; and
one or more processors that execute instructions that enable performance of actions, including:
determining credential information to access a resource server based on credential instructions and a client request received by a mesh agent on an overlay network that includes a plurality of mesh agents;
communicating the client request and the credential information to the resource server via the mesh agent; and
in a response to the client request generated by the resource server, forwarding the response to the client over the overlay network via the mesh agent; and
a client computer, comprising:
a memory that stores at least instructions; and
one or more processors that execute instructions that enable performance of actions, including:
providing the client request.

9. The system of claim 8, wherein the plurality of mesh agents further comprises:
hosting one or more of the mesh agents on one or more network computers.

10. The system of claim 8, wherein communicating the client request further comprises:
generating a secure tunnel over the overlay network for communication between the client and the resource server.

11. The system of claim 8, wherein determining the credential information, further comprises:
determining an interpretation of the credential instructions based on one or more of a grammar or a ruleset based on the credential instructions and the client request;
determining one or more actions to access the credential information based on the interpretation of the credential instructions, wherein the one or more actions are executed to determine the credential information.

12. The system of claim 8, further comprising:
determining actions on how to activate credential information to gain access to the resource server based on the credential instructions.

13. The system of claim 8, further comprising:
determining one or more application protocols employed for communication between the client and the resource server based on network traffic; and
generating one or more application models to provide instructions for credential management for distributed services based on the one or more application protocols.

14. The system of claim 8, further comprising:
generating one or more application models that include information for determining one or more fields to modify for injection of credential secrets in application protocol network traffic between the client and the resource server.

15. A processor readable non-transitory storage media that includes instructions for managing access to network resources over a network, wherein execution of the instructions by one or more processors on one or more network computers performs actions, comprising:
determining credential information to access a resource server based on credential instructions and a client request received by a mesh agent on an overlay network that includes a plurality of mesh agents;
communicating the client request and the credential information to the resource server via the mesh agent; and
in a response to the client request generated by the resource server, forwarding the response to the client over the overlay network via the mesh agent.

16. The processor readable non-transitory storage media of claim 15, wherein the plurality of mesh agents further comprises:
hosting one or more of the mesh agents on one or more network computers.

17. The processor readable non-transitory storage media of claim 15, wherein communicating the client request further comprises:
generating a secure tunnel over the overlay network for communication between the client and the resource server.

18. The processor readable non-transitory storage media of claim 15, wherein determining the credential information, further comprises:
determining an interpretation of the credential instructions based on one or more of a grammar or a ruleset based on the credential instructions and the client request;
determining one or more actions to access the credential information based on the interpretation of the credential instructions, wherein the one or more actions are executed to determine the credential information.

19. The processor readable non-transitory storage media of claim 15, further comprising:
determining one or more application protocols employed for communication between the client and the resource server based on network traffic; and
generating one or more application models to provide instructions for credential management for distributed services based on the one or more application protocols.

20. The processor readable non-transitory storage media of claim 15, further comprising:
generating one or more application models that include information for determining one or more fields to modify for injection of credential secrets in application protocol network traffic between the client and the resource server.

* * * * *